(12) United States Patent
Chheda et al.

(10) Patent No.: US 9,447,349 B2
(45) Date of Patent: Sep. 20, 2016

(54) DIRECT AQUEOUS PHASE REFORMING OF BIO-BASED FEEDSTOCKS

(71) Applicant: SHELL OIL COMPANY, Houston, TX (US)

(72) Inventors: Juben Nemchand Chheda, Houston, TX (US); Joseph Broun Powell, Houston, TX (US)

(73) Assignee: Shell Oil Company, Houston, TX (US)

( * ) Notice: Subject to any disclaimer, the term of this patent is extended or adjusted under 35 U.S.C. 154(b) by 341 days.

(21) Appl. No.: 13/828,517

(22) Filed: Mar. 14, 2013

(65) Prior Publication Data

US 2013/0199085 A1 Aug. 8, 2013

Related U.S. Application Data

(63) Continuation of application No. 12/972,154, filed on Dec. 17, 2010, now Pat. No. 9,303,226.

(60) Provisional application No. 61/291,572, filed on Dec. 31, 2009.

(51) Int. Cl.
*C10L 1/18* (2006.01)
*C10L 5/00* (2006.01)
(Continued)

(52) U.S. Cl.
CPC ............... *C10L 1/1826* (2013.01); *C10G 3/45* (2013.01); *C10G 3/46* (2013.01); *C10G 3/47* (2013.01); *C10G 3/49* (2013.01); *C10L 1/1824* (2013.01); *C10G 2300/1011* (2013.01);
(Continued)

(58) Field of Classification Search
CPC .............. C10G 2300/1011; C10G 2300/4025; C10G 2300/44; C10G 2300/80; C10G 2400/02; C10G 2400/04; C10G 2400/08; C10G 3/45; C10G 3/46; C10G 3/47; C10G 3/49; C10L 1/1824; C10L 1/1826; Y02T 50/678; Y02P 30/20
USPC .................................................... 44/445, 639
See application file for complete search history.

(56) References Cited

U.S. PATENT DOCUMENTS 4,013,734 A 3/1977 Kim
4,174,976 A 11/1979 Tsao et al.
(Continued)

FOREIGN PATENT DOCUMENTS

CN 101514349 8/2009
WO 03045841 6/2003
(Continued)

OTHER PUBLICATIONS

Bommei P.G., et al; "Production of conventional liquid fuels from sugars"; retrieved from internet: URL: http://www.virent.com/Bioforming/Viren; 13 pages; Aug. 25, 2008.
(Continued)

*Primary Examiner* — Latosha Hines

(57) ABSTRACT

A method comprises providing a bio-based feedstock; contacting the bio-based feedstock with a solvent in a hydrolysis reaction to form an intermediate stream comprising carbohydrates; contacting the intermediate stream with an apr catalyst to form a plurality of oxygenated intermediates, wherein a first portion of the oxygenated intermediates are recycled to form the solvent; and processing at least a second portion of the oxygenated intermediates to form a fuel blend.

13 Claims, 1 Drawing Sheet

(51) Int. Cl.
*C10L 1/182* (2006.01)
*C10G 3/00* (2006.01)

(52) U.S. Cl.
CPC . *C10G 2300/4025* (2013.01); *C10G 2300/44* (2013.01); *C10G 2300/80* (2013.01); *C10G 2400/02* (2013.01); *C10G 2400/04* (2013.01); *C10G 2400/08* (2013.01); *Y02P 30/20* (2015.11); *Y02T 50/678* (2013.01)

(56) References Cited

U.S. PATENT DOCUMENTS

| | | |
|---|---|---|
| 4,223,001 A | 9/1980 | Novotny et al. |
| 4,380,679 A | 4/1983 | Arena |
| 4,380,680 A | 4/1983 | Arena |
| 4,382,150 A | 5/1983 | Arena |
| 4,401,823 A | 8/1983 | Arena |
| 4,456,779 A | 6/1984 | Owen et al. |
| 4,487,980 A | 12/1984 | Arena |
| 4,503,274 A | 3/1985 | Arena |
| 4,541,836 A | 9/1985 | Derderian |
| 4,543,435 A | 9/1985 | Gould et al. |
| 4,554,260 A | 11/1985 | Pieters et al. |
| 4,670,613 A | 6/1987 | Ruyter et al. |
| 4,717,465 A | 1/1988 | Chen et al. |
| 4,828,812 A | 5/1989 | McCullen et al. |
| 4,885,421 A | 12/1989 | Harandi et al. |
| 4,919,896 A | 4/1990 | Harandi et al. |
| 4,935,568 A | 6/1990 | Harandi et al. |
| 5,001,292 A | 3/1991 | Harandi et al. |
| 5,019,135 A | 5/1991 | Sealock, Jr. et al. |
| 5,095,159 A | 3/1992 | Harandi et al. |
| 5,105,044 A | 4/1992 | Han et al. |
| 5,130,101 A | 7/1992 | Harandi et al. |
| 5,139,002 A | 8/1992 | Lynch et al. |
| 5,177,279 A | 1/1993 | Harandi |
| 5,180,868 A | 1/1993 | Baker et al. |
| 5,238,898 A | 8/1993 | Han et al. |
| 5,344,849 A | 9/1994 | Ayasse |
| 5,578,647 A | 11/1996 | Li et al. |
| 5,616,154 A | 4/1997 | Elliott et al. |
| 5,651,953 A | 7/1997 | Yokoyama et al. |
| 5,660,602 A | 8/1997 | Collier, Jr. et al. |
| 5,666,923 A | 9/1997 | Collier, Jr. et al. |
| 5,787,863 A | 8/1998 | Henig et al. |
| 5,861,137 A | 1/1999 | Edlund |
| 5,879,463 A | 3/1999 | Proenca |
| 5,959,167 A | 9/1999 | Shabtai et al. |
| 6,054,041 A | 4/2000 | Ellis et al. |
| 6,059,995 A | 5/2000 | Topsoe et al. |
| 6,152,975 A | 11/2000 | Elliott et al. |
| 6,171,992 B1 | 1/2001 | Autenrieth et al. |
| 6,172,272 B1 | 1/2001 | Shabtai et al. |
| 6,207,132 B1 | 3/2001 | Lin et al. |
| 6,235,797 B1 | 5/2001 | Elliot et al. |
| 6,280,701 B1 | 8/2001 | Autenrieth et al. |
| 6,291,725 B1 | 9/2001 | Chopade et al. |
| 6,323,383 B1 | 11/2001 | Tsuchida et al. |
| 6,361,757 B1 | 3/2002 | Shikada et al. |
| 6,372,680 B1 | 4/2002 | Wu et al. |
| 6,387,554 B1 | 5/2002 | Verykios |
| 6,397,790 B1 | 6/2002 | Collier, Jr. |
| 6,413,449 B1 | 7/2002 | Wieland et al. |
| 6,440,895 B1 | 8/2002 | Tonkovich et al. |
| 6,479,428 B1 | 11/2002 | Tonkovich et al. |
| 6,479,713 B1 | 11/2002 | Werpy et al. |
| 6,486,366 B1 | 11/2002 | Ostgard et al. |
| 6,508,209 B1 | 1/2003 | Collier, Jr. |
| 6,570,043 B2 | 5/2003 | Elliott et al. |
| 6,607,707 B2 | 8/2003 | Reichman et al. |
| 6,670,300 B2 | 12/2003 | Werpy et al. |
| 6,677,385 B2 | 1/2004 | Werpy et al. |
| 6,699,457 B2 | 3/2004 | Cortright et al. |
| 6,739,125 B1 | 5/2004 | Mulligan |
| 6,749,828 B1 | 6/2004 | Fukunaga |
| 6,762,149 B2 | 7/2004 | Tonkovich et al. |
| 6,765,101 B1 | 7/2004 | Bhasin et al. |
| 6,841,085 B2 | 1/2005 | Werpy et al. |
| 6,953,873 B2 | 10/2005 | Cortright et al. |
| 6,964,757 B2 | 11/2005 | Cortright et al. |
| 6,964,758 B2 | 11/2005 | Cortright et al. |
| 6,969,506 B2 | 11/2005 | Tonkovich et al. |
| 7,022,824 B2 | 4/2006 | Vanoppen et al. |
| 7,038,094 B2 | 5/2006 | Werpy et al. |
| 7,186,668 B2 | 3/2007 | Werpy et al. |
| 7,199,250 B2 | 4/2007 | Werpy et al. |
| 7,273,957 B2 | 9/2007 | Bakshi et al. |
| 7,288,685 B2 | 10/2007 | Marker |
| 8,231,857 B2 * | 7/2012 | Cortright et al. .......... 423/648.1 |
| 2002/0020107 A1 | 2/2002 | Bailey et al. |
| 2003/0099593 A1 | 5/2003 | Cortright et al. |
| 2003/0100807 A1 | 5/2003 | Shabtai et al. |
| 2003/0115792 A1 | 6/2003 | Shabtai et al. |
| 2003/0167679 A1 | 9/2003 | Jordan |
| 2005/0065337 A1 | 3/2005 | Werpy et al. |
| 2005/0203195 A1 | 9/2005 | Wang et al. |
| 2005/0207971 A1 | 9/2005 | Cortright et al. |
| 2005/0244329 A1 | 11/2005 | Casanave et al. |
| 2005/0271579 A1 | 12/2005 | Rogers |
| 2006/0013759 A1 | 1/2006 | Jiang et al. |
| 2007/0173643 A1 | 7/2007 | Werpy et al. |
| 2007/0173651 A1 | 7/2007 | Holladay et al. |
| 2007/0173652 A1 | 7/2007 | Holladay et al. |
| 2008/0025903 A1 * | 1/2008 | Cortright ................ C01B 3/323 423/437.1 |
| 2008/0103344 A1 * | 5/2008 | Jones ........................ C01B 3/22 585/242 |
| 2008/0216391 A1 * | 9/2008 | Cortright ................ C10G 3/45 44/307 |
| 2008/0300434 A1 | 12/2008 | Cortright et al. |
| 2008/0300435 A1 | 12/2008 | Cortright et al. |
| 2008/0302001 A1 | 12/2008 | Koivusalmi et al. |
| 2009/0113787 A1 | 5/2009 | Elliott et al. |
| 2009/0124839 A1 | 5/2009 | Dumesic et al. |
| 2009/0255171 A1 | 10/2009 | Dumesic et al. |
| 2010/0076233 A1 | 3/2010 | Cortright et al. |
| 2010/0077655 A1 | 4/2010 | Bauldreay et al. |
| 2010/0218417 A1 | 9/2010 | Bauldreay et al. |
| 2011/0282115 A1 | 11/2011 | Chheda et al. |

FOREIGN PATENT DOCUMENTS

| | | |
|---|---|---|
| WO | 2006119357 | 11/2006 |
| WO | 2007075370 | 7/2007 |
| WO | 2007075476 | 7/2007 |
| WO | 2008109877 | 9/2008 |

OTHER PUBLICATIONS

Huber, G.W., et al.; "An overview of aqueous-hase catalytic processes for production of hydrogen and alkanes in a biorefinery; Catalysis Today; vol. 111, No. 1-2; pp. 119-132; Jan. 15, 2006".

Elliott D.C.; "Historical Developments in Hydroprocessing Bio-Oils"; Energy & Fuels, vol. 21, No. 3.; pp. 1793-1815; May 16, 2007.

Mosier, N.S., et al.; "Characterization of Acid Catalytic Domains for Cellulose Hydrolysis and Glucose Degradation"; Biotechnology and Bioengineering; vol. 79, No. 6; pp. 610-618; Sep. 20, 2002.

International Search Report for counter-part application PCT/US2010/061246 dated Apr. 5, 2011.

Davda, R.R., et al., "A Review of Catalystic Issues and Process Conditions for Renewable Hydrogen and Alkanes by Aqueous-Phase Reforming of Oxygenated Hydrocarbons Over Supported Metal Catalysts," Applied Catalysis, B: Environmental, p. 1-16 (2004).

Davda, R.R., et al., "Catalytic Reforming of Oxygenated Hydrocarbons for Hydrogen with Low Levels of Carbon Monoxide," Angewandte Chemie International 42: 4068-4071 (2003).

Huber, G.W., et al., "Production of Liquid Alkanes by Aqueous-Phase Processing of Biomass-Derived Carbohydrates," Science 308: 1446-1450 (2005).

(56) References Cited

OTHER PUBLICATIONS

Huber, G.W., et al., "Renewable Alkanes by Aqueous-Phase Reforming of Biomass-Derived Oxygenates," Angewandte Chemie International 43: 1549-1551 (2004).
Shabaker, J.W., et al., "Aqueous-Phase Reforming of Ethylene Glycol Over Supported Platinum Catalysts," Catalysis Letters 88:1-8 (2003).
Badger, P.C., "Ethanol From Cellulose: A General Review," Ethanol From Cellulose: A General Review p. 17-21 (2002).
Bardin, B.B. et al. "Acidity of Keggin-Type Heteropolycompounds Evaluated by Catalytic Probe Reactions, Sorption Microcalorimetry, and Density Functional Quantum Chemical Calculations," J. Phys. Chem. B 102-10817-10825 (1998).
Barrett, C.J., et al., "Single-Reactor Process for Sequential Aldol-Condensation and Hydrogenation of Biomass-Derived Compounds in Water," Applied Catalysis B: Environmental 66:111-118 (2006).
Brown, N.F., et al., "Carbon-Halogen Bond Scission and Rearrangement of Beta-Halohydrins on the Rh(111) Surface," J. Phys. Chem. 98:12737-12745 (1994).
Chen, N.Y., et al., "Liquid Fuel From Carbohydrates," Chemtech Aug. 1986 p. 506-509.
Chiu, C.W., et al., "Distribution of Methanol and Catalysts Between Biodiesel and Glycerin Phases," AIChE Journal 51:1274-1278 (2005).
Corma, A., et al., "Processing Biomass-Derived Oxygenates in the Oil Refinery: Catalytic Cracking (FCC) Reaction Pathways and Role of Catalyst," J. of Catalysis 247:307-327 (2007).
Cortright, R.D., et al., "Hydrogen From Catalytic Reforming of Biomass-Derived Hydrocarbons in Liquid Water," Nature 418:964-967 (2002).
Dasari, M.A., et al., "Low-Pressure Hydrogenolysis of Glycerol to Propylene Glycol," Applied Catalysis A: General 281:225-231 (2005).
Dass, D.V., et al., "A Comparative Study of the Conversion of Ethanol and of Ethylene Over the "Mobil" Zeolite Catalyst, H-ZSM-5. An Application of the Benzene Sequestration Test," Can. J. Chem. 67:1732-1734 (1989).
Davda, R.R., et al., "Aqueous-Phase Reforming of Ethylene Glycol on Silica-Supported Metal Catalysts," Applied Catalysis B: Environment 43:13-26 (2003).
Dos Santos, S.M., et al., "Performance of RuSn Catalysts Supported on different Oxides in the Selective Hydrogenation of Dimethyl Adipate," Catalysis Today 107-108:250-257 (2005).
Elliott, D.C., et al., "Chemical Processing in High-Pressure Aqueous Environments. 2. Development of Catalyts for Gasification," Ind. Eng. Chem. Res. 32: 1542-1548 (1993).
Elliott, D.C. et al., "Liquid Fuels by Low-Severity Hydrotreating of Biocrude," Developments in Thermochemical Biomass Conversion 1:611-621 (1996).
Elliott, D.C., et al., "Chemical Processing in High-Pressure Aqueous Environments 6. Demonstration of Catalytic Gasification for Chemical Manufacturing Wastewater Cleanup in Industrial Plants," Ind. Eng. Chem. Res. 38:879-883 (1999).
Fraser, J., "Seeking Alpha-Roadmap for Cellulosic Ethanol Production"; Jul. 12, 2006; 3 pages.
Fukuoka, A., et al., "Catalytic Conversion of Cellulose Into Sugar Alcohols," Angew. Chem. Int. Ed. 5:5161-5163 (2006).
Gayubo, A.G., et al., "Transformation of Oxygenate Components of Biomass Pyrolysis Oil on a HZSM-5 Zeolite. I. Alcohols and Phenols," Ind. Eng. Chem. Res. 43:2610-2618 (2004).
Greer, D., "Creating Cellulosic Ethanol: Spinning Straw Into Fuel," BioCycle; May 2005 eNews Bulletin; 10 pages.

Huber, G.W., et al., "Raney Ni-Sn Catalyst for H2 Production From Biomass-Derived Hydrocarbons," Science 300:2075-2077 (2003).
Huber, G.W., et al., "Synthesis of Transportation Fuels From Biomass: Chemistry, Catalysts, and Engineering," Chem. Rev. 106: 4044-4098 (2006).
Kawai, M., et al., "Production of Hydrogen and Hydrocarbon From Cellulose and Water," Chemistry Letters P. 1185-1188 (1981).
Kluson, P., et al., "Selective Hydrogenation Over Ruthenium Catalysts," Applied Catalysis A: General 128:13-31 (1995).
Makarova, M.A., et al., "Dehydration of n-Butanol on Zeolite H-ZSM-5 and Amorphous Aluminosilicate: Detailed Mechanistic Study and the Effect of Pore Confinement," Journal of Catalysis 149:36-51 (1994).
Minowa, T., et al. "Hydrogen Production From Wet Cellulose by Low Temperature Gasification Using a Reduced Nickel Catalyst," Chemistry Letters p. 937-938 (1995).
Minowa, T., et al., "Hydrogen Production From Cellulose in Hot Compressed Water Using Reduced Nickel Catalyst: Product Distribution At Different Reaction Temperature," J. of Chem. Eng. of Japan 31:488-491 (1998).
Nelson, D.A., et al., "Application of Direct Thermal Liquefaction for the Conversion of Cellulosic Biomass," Ind. Eng. Chem. Prod. Res. Dev. 23:471-475 (1984).
Oregon Cellulose-Ethanol Study, "Appendix B—Overview of Cellulose-Ethanol Production Technology," p. 57-60.
Roman-Leshkov, Y., et al., "Production of Dimethylfuran for Liquid Fuels From Biomass-Derived Carbohydrates," Nature 447:982-986 (2007).
Rostrup-Nielsen, J.R., "Conversion of Hydrocarbons and Alcohols for Fuel Cells," Phys. Chem. Chem. Phys. 3:283-288 (2001).
Shabaker, J.W., et al., "Aqueous-Phase Reforming of Methanol and Ethylene Glycol over Alumina-Supported Platinum Catalysts," Journal of Catalysis 215:344-352 (2003).
Shabaker, J.W., et al., "Aqueous-Phase Reforming of Oxygenated Hydrocarbons Over Sn-Modified Ni Catalysts," Journal of Catalysis 222:180-191 (2004).
Silva, A.M., et al., "Role of Catalyst Preparation on Determining Selective Sites for Hydrogenation of Dimethyl Adipate Over RuSn/A12O3," J. of Molecular Catalysis A: Chemical 253:62-69 (2006).
Tsuchida, T., et al., "Direct Synthesis of n-Butanol From Ethanol Over Nonstoichiometric Hyroxyapatite," Ind. Eng. Chem. Res. 45:8634-9642 (2006).
Wang, D., et al., "Catalytic Stream Reforming of Biomass-Derived Oxygenates: Acetic Acid and Hydroxyacetaldehyde," Applied Catalysis A: General 143:245-270 (1996).
Werpy, T., et al., "Top Value Added Chemicals From Biomass vol. 1-Results of Screening for Potential Candidates From Sugars and Synthesis Gas." (2004).
Yoshida, T., et al., "Gasification of Cellulose, Xylan, and Lignini Mixtures in Supercritical Water," Ind. Eng. Chem. Res. 40:5469-5474 (2001).
Blommel, P. G. et al., "Production of Conventional Liquid Fuels from Sugars," Aug. 25, 2008, pp. 1-14, Retrieved from the Internet: URL:http://www.Virent.com/BioForming/Virent_Technology_Whitepaper.pdf.
Zhou, J. H. et al., "Carbon nanofiber/graphite-felt composite supported Ru catalysts for hydrogenolysis of sorbitol," Catalysis Today, Elsevier, NL, vol. 147, Sep. 1, 2009, pp. S225-S229.
Shabaker, J.W., et al., "Sn-Modified Ni Catalysts for aqueou-phase reforming: Characterization and deactivation studies," Journal of Catalysis 231:67-76 (2005).

\* cited by examiner

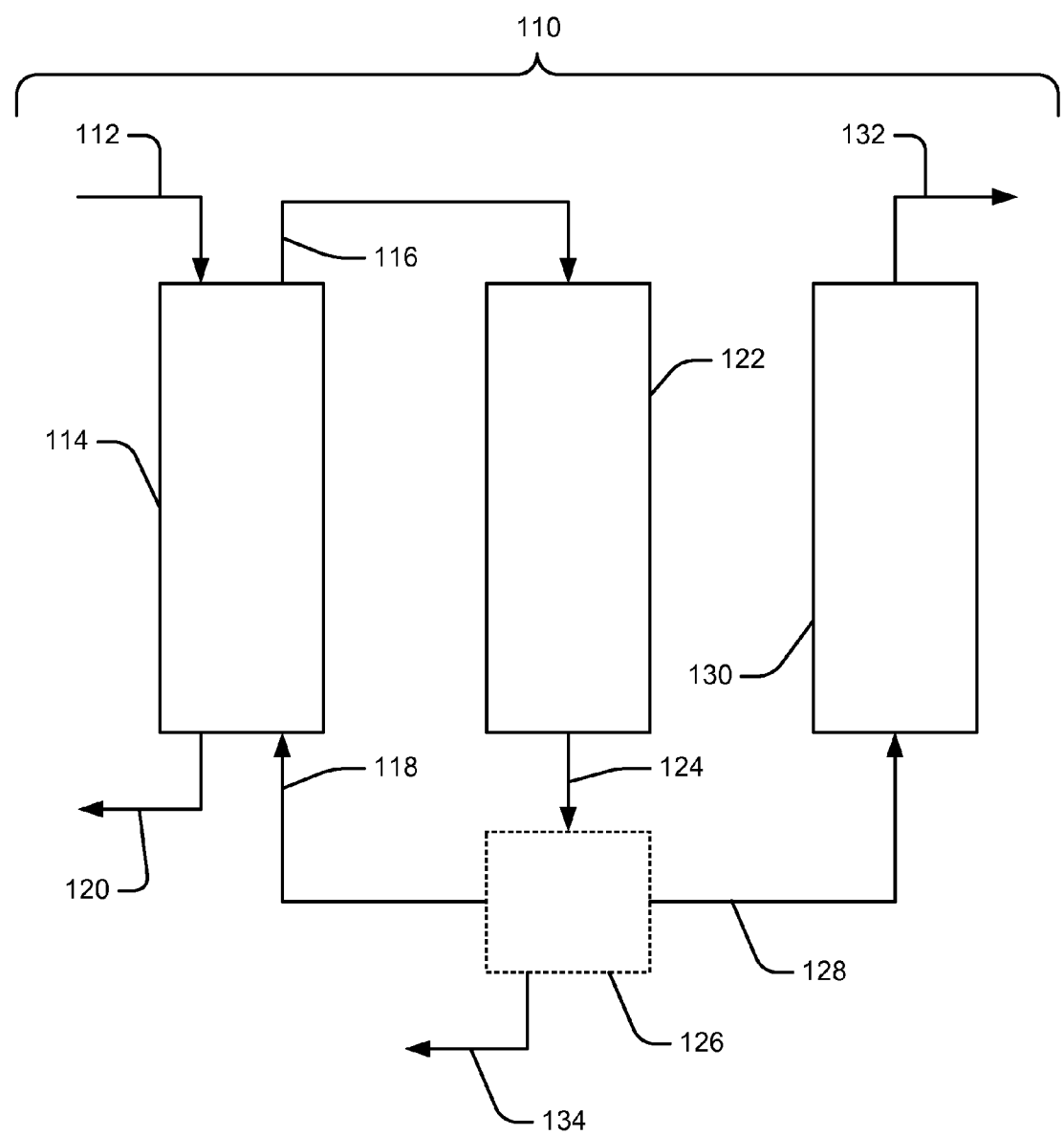

DIRECT AQUEOUS PHASE REFORMING OF BIO-BASED FEEDSTOCKS

The present application is a continuation of U.S. patent application Ser. No., 12/972,154 filed Dec. 17, 2012 (pending), which claims the benefit of U.S. Provisional Patent Application Ser. No. 61/291,572, filed Dec. 31, 2009, the entire disclosure of which is hereby incorporated by reference.

FIELD OF THE INVENTION

A significant amount of attention has been placed on developing new technologies for providing energy from resources other than fossil fuels. Biomass is a resource that shows promise as a fossil fuel alternative. As opposed to fossil fuel, biomass is also renewable.

BACKGROUND OF THE INVENTION

Biomass may be useful as a source of renewable fuels. One type of biomass is plant biomass. Plant biomass is the most abundant source of carbohydrate in the world due to the lignocellulosic materials composing the cell walls in higher plants. Plant cell walls are divided into two sections, primary cell walls and secondary cell walls. The primary cell wall provides structure for expanding cells and is composed of three major polysaccharides (cellulose, pectin, and hemicellulose) and one group of glycoproteins. The secondary cell wall, which is produced after the cell has finished growing, also contains polysaccharides and is strengthened through polymeric lignin covalently cross-linked to hemicellulose. Hemicellulose and pectin are typically found in abundance, but cellulose is the predominant polysaccharide and the most abundant source of carbohydrates.

Most transportation vehicles require high power density provided by internal combustion and/or propulsion engines. These engines require clean burning fuels which are generally in liquid form or, to a lesser extent, compressed gases. Liquid fuels are more portable due to their high energy density and their ability to be pumped, which makes handling easier.

Currently, bio-based feedstocks such as biomass provides the only renewable alternative for liquid transportation fuel. Unfortunately, the progress in developing new technologies for producing liquid biofuels has been slow in developing, especially for liquid fuel products that fit within the current infrastructure. Although a variety of fuels can be produced from biomass resources, such as ethanol, methanol, biodiesel, Fischer-Tropsch diesel, and gaseous fuels, such as hydrogen and methane, these fuels require either new distribution technologies and/or combustion technologies appropriate for their characteristics. The production of these fuels also tends to be expensive and raise questions with respect to their net carbon savings.

Carbohydrates are the most abundant, naturally occurring biomolecules. Plant materials store carbohydrates either as sugars, starches, celluloses, lignocelluloses, hemicelluloses, and any combination thereof. In one embodiment, the carbohydrates include monosaccharides, polysaccharides or mixtures of monosaccharides and polysaccharides. As used herein, the term "monosaccharides" refers to hydroxy aldehydes or hydroxy ketones that cannot be hydrolyzed to smaller units. Examples of monosaccharides include, but are not limited to, dextrose, glucose, fructose and galactose. As used herein, the term "polysaccharides" refers to saccharides comprising two or more monosaccharide units. Examples of polysaccharides include, but are not limited to, cellulose, sucrose, maltose, cellobiose, and lactose. Carbohydrates are produced during photosynthesis, a process in which carbon dioxide is converted into organic compounds as a way to store energy. The carbohydrates are highly reactive compounds that can be easily oxidized to generate energy, carbon dioxide, and water. The presence of oxygen in the molecular structure of carbohydrates contributes to the reactivity of the compound. Water soluble carbohydrates react with hydrogen over catalyst(s) to generate polyols and sugar alcohols, either by hydrogenation, hydrogenolysis or both.

U.S. Publication No. 20080216391 to Cortright et al. describes a process for converting carbohydrates to higher hydrocarbons by passing carbohydrates through a hydrogenation reaction followed by an Aqueous Phase Reforming ("APR") process. The hydrogenation reaction produces polyhydric alcohols that can withstand the conditions present in the APR reaction. Further processing in an APR reaction and a condensation reaction can produce a higher hydrocarbon for use as a fuel. Currently APR is limited to feedstocks including sugars or starches, which competes with the use of these materials for food resulting in a limited supply. There is a need to directly process bio-based feedstocks including "biomass", or lignocellulosic feedstocks, into liquid fuels.

SUMMARY OF THE INVENTION

An embodiment of the present invention comprises providing a bio-based feedstock; contacting the bio-based feedstock with a solvent in a hydrolysis reaction to form an intermediate stream comprising carbohydrates; contacting the intermediate stream with an APR catalyst to form a plurality of oxygenated intermediates, wherein a first portion of the oxygenated intermediates are recycled to form the solvent; and processing at least a second portion of the oxygenated intermediates to form a fuel blend.

Another embodiment of the present invention comprises a method comprising providing a bio-based feedstock; contacting the bio-based feedstock with a hydrolysis catalyst and a solvent to form an intermediate stream comprising carbohydrates; contacting at least a portion of the intermediate stream with a hydrogenolysis catalyst in the presence of first hydrogen source to form at least some hydrogenolysis reaction products; contacting at least a portion of the intermediate stream with a hydrogenation catalyst in the presence of second hydrogen source to form at least some hydrogenation reaction products; contacting at least a portion of the intermediate stream with an APR catalyst to form an APR reaction product; wherein at least a portion of the hydrogenolysis reaction products, at least a portion of the hydrogenation reaction products, and at a least a portion of the APR reaction products are combined to form a plurality of oxygenated intermediates, wherein a first portion of the oxygenated intermediates are recycled to form the solvent; and processing at least a second portion of the oxygenated intermediates to form a fuel blend.

Still another embodiment of the present invention comprises a system comprising a hydrolysis reactor operating under hydrolysis conditions for receiving a bio-based feedstock and a solvent and discharging an intermediate stream comprising a carbohydrate; an APR reactor comprising an APR catalyst for receiving the intermediate stream and discharging an oxygenated intermediate stream, wherein a first portion of the oxygenated intermediate stream is recycled to the hydrolysis reactor as the solvent; and a fuels processing reactor for receiving a second portion of the oxygenated intermediate stream and discharging a fuel blend.

The features and advantages of the invention will be apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the invention, and should not be used to limit or define the invention.

FIG. 1 schematically illustrates a block flow diagram of an embodiment of a higher hydrocarbon production process of this invention.

DETAILED DESCRIPTION OF THE INVENTION

The invention relates to the production of higher hydrocarbons suitable for use in transportation fuels and industrial chemicals from bio-based feedstocks, such as biomass, carbohydrates, which include sugars, sugar alcohols, celluloses, lignocelluloses, hemicelluloses, and any combination thereof. The higher hydrocarbons produced are useful in forming transportation fuels, such as synthetic gasoline, diesel fuel, and jet fuel, as well as industrial chemicals. As used herein, the term "higher hydrocarbons" refers to hydrocarbons having an oxygen to carbon ratio less than the oxygen to carbon ratio of at least one component of the bio-based feedstock. As used herein the term "hydrocarbon" refers to an organic compound comprising primarily hydrogen and carbon atoms, which is also an unsubstituted hydrocarbon. In certain embodiments, the hydrocarbons of the invention also comprise heteroatoms (i.e., oxygen or sulfur) and thus the term "hydrocarbon" may also include substituted hydrocarbons.

The methods and systems of the invention have an advantage of converting a raw bio-based feedstock through hydrolysis and APR reactions to form an oxygenated intermediate stream comprising polyols, alcohols, ketones, aldehydes, and other mono-oxygenated reaction products that can be fed directly to a condensation reactor to form higher hydrocarbons, which results in an increased conversion and conversion efficiency and minimizes the formation of unwanted by-products such as carmelins. While not intending to be limited by theory, it is believed that by controlling the concentration of carbohydrates fed to an APR process, degradation of carbohydrate at APR conditions can be minimized. Another advantage is that the invention provides methods that reduce the amount of unwanted byproducts, thereby improving the overall yield of products relative to the carbohydrates extracted from the bio-based feedstock. The invention reduces both the degradation products formed upon extraction of carbohydrates from the biomass and, through subsequent processing in an APR reaction, the amount of coke formed in the processing reactions to form a fuel blend. In some embodiments, oxygenated intermediates produced in the APR reaction are recycled within the process and system to form the in situ generated solvent, which is used in the bio-based feedstock digestion process. This recycle saves costs and can increase the amount of carbohydrates extracted from the bio-based feedstock. Further, by controlling the degradation of carbohydrate in the APR process, the hydrogenation reaction can be conducted along with the APR reaction at temperatures ranging from 175° C. to 275° C. As a result, a separate hydrogenation reaction can be avoided and the fuel forming potential of the bio-based feedstock fed to the process can be increased. This process and reaction scheme described herein also results in a capital cost savings and process operational cost savings. Advantages of specific embodiments will be described in more detail below.

In some embodiments, the invention provides methods comprising: providing a bio-based feedstock; contacting the bio-based feedstock with a solvent in a hydrolysis reaction to form an intermediate stream comprising carbohydrates; contacting the intermediate stream with an APR catalyst to form a plurality of oxygenated intermediates, wherein a first portion of the oxygenated intermediates are recycled to form the solvent; and processing at least a second portion of the oxygenated intermediates to form a fuel blend.

FIG. 1 shows an embodiment of a method of the present invention in which hydrolysis of a bio-based feedstock occurs in hydrolysis reaction 114 to produce an intermediate stream comprising carbohydrates 116, the intermediate stream 116 is fed to an APR reaction 122, and then outlet stream 124 (and optionally 128) are fed to a condensation reaction 130 to produce higher hydrocarbons.

In some embodiments, the reactions described below are carried out in any system of suitable design, including systems comprising continuous-flow, batch, semi-batch or multi-system vessels and reactors. One or more reactions may take place in an individual vessel and the process is not limited to separate reaction vessels for each reaction. In some embodiments the system of the invention utilizes a fluidized catalytic bed system. Preferably, the invention is practiced using a continuous-flow system at steady-state equilibrium.

As used herein, the term "bio-based feedstock" means organic materials produced by plants (e.g., leaves, roots, seeds and stalks), and microbial and animal metabolic wastes. Bio-based feedstocks can include biomass. Common sources of biomass include: agricultural wastes (e.g., corn stalks, straw, seed hulls, sugarcane leavings, bagasse, nutshells, and manure from cattle, poultry, and hogs); wood materials (e.g., wood or bark, sawdust, timber slash, and mill scrap); municipal waste (e.g., waste paper and yard clippings); and energy crops (e.g., poplars, willows, switch grass, alfalfa, prairie bluestream, corn, soybean). The term "biomass" also refers to the primary building blocks of all the above, including, but not limited to, saccharides, lignins, celluloses, hemicelluloses, and starches. Bio-based feedstocks can be a source of carbohydrates.

FIG. 1 shows an embodiment of the present invention for converting bio-based feedstocks into fuel products. In this embodiment, a bio-based feedstock 112 is introduced to a hydrolysis reaction 114 along with a recycle stream 118. The recycle stream 118 can comprise a number of components including in situ generated solvents, which may be useful in solvating sugars and lignins from the bio-based feedstock during the hydrolysis reaction. The term "in situ" as used herein refers to a component that is produced within the overall process; it is not limited to a particular reactor for production or use and is therefore synonymous with an in process generated component. The in situ generated solvents may comprise oxygenated intermediates. The hydrolysis reaction may comprise a hydrolysis catalyst (e.g., a metal or acid catalyst) to aid in the hydrolysis reaction. The reaction conditions in the hydrolysis reaction may vary within the reaction media so that a temperature gradient exists within the reaction media, allowing for hemi-cellulose to be extracted at a lower temperature than cellulose. For example, the reaction media may comprise an increasing temperature gradient from the bio-based feedstock 112. The non-extractable solids may be removed from the reaction as an outlet stream 120. The intermediate carbohydrate stream 116 is an intermediate stream that may comprise the hydrolyzed biomass in the form of carbohydrates. The composition of the intermediate carbohydrate stream 116 may vary and may comprise a number of different compounds. Preferably, the carbohydrates have 2 to 12 carbon atoms, and even more preferably 2 to 6 carbon atoms. The carbohydrates may also have an oxygen to carbon ratio from 0.5:1 to 1:1.2.

Various factors affect the conversion of the bio-based feedstock in the hydrolysis reaction. In some embodiments, hemi-cellulose can be extracted from the bio-based feedstock within an aqueous fluid and hydrolyzed at temperatures below 160° C. to produce a $C_5$ carbohydrate fraction. At increasing temperatures, this $C_5$ fraction can be thermally degraded. It is therefore advantageous to convert the $C_5$, $C_6$, or other sugar intermediates directly into more stable intermediates such as sugar alcohols. Even these intermediates can further degrade, such that running the APR reaction to convert them to polyols such as glycerol, ethylene glycol, propylene glycol, and mono-oxygenates is preferred to increase process yields. By recycling the oxygenated intermediates from the APR reaction and performing additional biomass hydrolysis with this recycled liquid, the concentration of active oxygenated intermediates can be increased to commercially viable concentrations without water dilution. Typically, a concentration of at least 2%, or 5% or preferable greater than 8% of organic intermediates in water, may be suitable for a viable process. This may be determined by sampling the intermediate stream at the outlet of the hydrolysis reaction and using a suitable technique such as chromatography to identify the concentration of total organics. The oxygenated intermediate stream has a fuel forming potential, as described below.

Cellulose extraction begins above 160° C., with solubilization and hydrolysis becoming complete at temperatures around 190° C., aided by organic acids (e.g., carboxylic acids) formed from partial degradation of carbohydrate components. Some lignins can be solubilized before cellulose, while other lignins may persist to higher temperatures. Organic in situ generated solvents, which may comprise a portion of the oxygenated intermediates, including, but not limited to, light alcohols and polyols, can assist in solubilization and extraction of lignin and other components.

At temperatures ranging from about 125° C. to 275° C., carbohydrates can degrade through a series of complex self-condensation reactions to form caramelans, which are considered degradation products that are difficult to convert to fuel products. In general, some degradation reactions can be expected with aqueous reaction conditions upon application of temperature, given that water will not completely suppress oligomerization and polymerization reactions.

In some embodiments of the invention, the bio-based feedstock is hydrolyzed in a liquid medium such an aqueous solution to obtain an intermediate carbohydrates stream for use in the process. There are various suitable bio-based feedstock hydrolysis reaction methods, including, but not limited to, acid hydrolysis, alkaline hydrolysis, enzymatic hydrolysis, catalytic hydrolysis, and hydrolysis using hot-compressed water. In certain embodiments, the hydrolysis reaction can occur at a temperature between 100° C. and 250° C. and pressure between 1 atm and 100 atm. In embodiments including strong acid and enzymatic hydrolysis, the hydrolysis reaction can occur at temperatures as low as ambient temperature and pressure between 1 atm and 100 atm. In some embodiments, the hydrolysis reaction may comprise a hydrolysis catalyst (e.g., a metal or acid catalyst) to aid in the hydrolysis reaction. The catalyst can be any catalyst capable of effecting a hydrolysis reaction. For example, suitable catalysts can include, but are not limited to, acid catalysts, base catalysts, metal catalysts, and any combination thereof. Acid catalysts can include organic acids such as acetic, formic, levulinic acid, and any combination thereof. In an embodiment the acid catalyst may be generated in the APR reaction and comprise a component of the oxygenated intermediate stream.

In some embodiments, the aqueous solution may contain an in situ generated solvent. The in situ generated solvent generally comprises at least one alcohol or polyol capable of solvating one or more hydrolysis reaction products or other components of the bio-based feedstock. For example, an alcohol may be useful for solvating lignin from a biomass feedstock for use within the process. The in situ generated solvent may also include one or more organic acids. In some embodiments, the organic acid can act as a catalyst in the hydrolysis of the bio-based feedstock. Each in situ generated solvent component may be supplied by an external source or it may be generated within the process and recycled to the hydrolysis reactor. For example, a portion of the oxygenated intermediates produced in the APR reaction may be separated in the separator stage for use as the in situ generated solvent in the hydrolysis reaction. In an embodiment, the in situ generated solvent can be separated, stored, and selectively injected into the recycle stream so as to maintain a desired concentration in the recycle stream.

The temperature of the hydrolysis reaction can be chosen so that the maximum amount of extractable carbohydrates are hydrolyzed and extracted as carbohydrates from the bio-based feedstock while limiting the formation of degradation products. In some embodiments, a plurality of reactor vessels may be used to carry out the hydrolysis reaction. These vessels may have any design capable of carrying out a hydrolysis reaction. Suitable reactor vessel designs can include, but are not limited to, co-current, counter-current, stirred tank, or fluidized bed reactors. In this embodiment, the bio-based feedstock may first be introduced into a reactor vessel operating at approximately 160° C. At this temperature the hemicellulose may be hydrolyzed to extract the $C_5$ carbohydrates and some lignin without degrading these products. The remaining bio-based feedstock solids may then exit the first reactor vessel and pass to a second reactor vessel. The second vessel may be operated between 160° C. and 250° C. so that the cellulose is further hydrolyzed to form $C_6$ carbohydrates. The remaining bio-based feedstock solids may then exit the second reactor as a waste stream while the intermediate stream from the second reactor can be cooled and combined with the intermediate stream from the first reactor vessel. The combined outlet stream may then pass to the APR reactor. In another embodiment, a series of reactor vessels may be used with an increasing temperature profile so that a desired carbohydrate fraction is extracted in each vessel. The outlet of each vessel can then be cooled prior to combining the streams, or the streams can be individually fed to the APR reaction for conversion of the intermediate carbohydrate streams to one or more oxygenated intermediate streams.

In another embodiment, the hydrolysis reaction as shown in FIG. 1 may take place in a single vessel. This vessel may have any design capable of carrying out a hydrolysis reaction. Suitable reactor vessel designs can include, but are not limited to, co-current, counter-current, stirred tank, or fluidized bed reactors. In some embodiments, a counter-current reactor design is used in which the biomass flows counter-current to the aqueous stream, which may comprise an in situ generated solvent. In this embodiment, a temperature profile may exist within the reactor vessel so that the temperature within the hydrolysis reaction media at or near the bio-based feedstock inlet is approximately 160° C. and the temperature near the bio-based feedstock outlet is approximately 200° C. to 250° C. The temperature profile may be obtained through the introduction of an aqueous fluid comprising an in situ generated solvent above 200° C. to 250° C. near the bio-based feedstock outlet while simultaneously introducing a bio-based feedstock at 160° C. or below. The specific inlet temperature of the aqueous fluid and the bio-based feedstock will be determined based a heat balance between the two streams. The resulting temperature profile may be useful for the hydrolysis and extraction of cellulose, lignin, and hemicellulose without the substantial production of degradation products.

Other means may be used to establish an appropriate temperature profile for the hydrolysis reaction and extraction of cellulose and hemicellulose along with other components such as lignin without substantially producing degradation products. For example, internal heat exchange structures may be used within one or more reaction vessels to maintain a desired temperature profile for the hydrolysis reaction. Other structures as would be known to one of ordinary skill in the art may also be used.

Each reactor vessel of the invention preferably includes an inlet and an outlet adapted to remove the product stream from the vessel or reactor. In some embodiments, the vessel in which hydrolysis reaction or some portion of the hydrolysis reaction occurs may include additional outlets to allow for the removal of portions of the reactant stream to help maximize the desired product formation. Suitable reactor designs can include, but are not limited to, a backmixed reactor (e.g., a stirred tank, a bubble column, and/or a jet mixed reactor) may be employed if the viscosity and characteristics of the partially digested bio-based feedstock and liquid reaction media is sufficient to operate in a regime where bio-based feedstock solids are suspended in an excess liquid phase (as opposed to a stacked pile digester).

The relative composition of the various carbohydrate components in the intermediate carbohydrate stream in the methods of the present invention affects the formation of undesirable by-products such as coke in the APR reaction. In particular, a low concentration of carbohydrates in the intermediate stream can affect the formation of unwanted by-products. In preferred embodiments, it is desirable to have a concentration of no more than 5% of readily degradable carbohydrates or heavy end precursors in the intermediate stream, while maintaining a total organic intermediates concentration, which includes the oxygenated intermediates (e.g., mono-oxygenates and/or diols), concentration as high as possible via use of the recycle concept.

In some embodiments of the invention, the carbohydrates in the intermediate carbohydrate stream produced by the hydrolysis reaction are partially de-oxygenated by adding hydrogen or another suitable catalyst to the hydrolysis reactor.

APR converts polyhydric alcohols to aldehydes, which react over a catalyst with water to form hydrogen, carbon dioxide, and oxygenated intermediates, which comprise smaller polyhydric alcohols. The polyhydric alcohols can further react through a series of deoxygenation reactions to form additional oxygenated intermediates that can produce higher hydrocarbons through a condensation reaction.

Referring again to FIG. 1, according to one embodiment, the intermediate carbohydrate stream 116 from the hydrolysis reaction 114 can be passed to an APR reaction to produce oxygenated intermediates. Intermediate carbohydrate stream 116 can comprise $C_5$ and $C_6$ carbohydrates that can be reacted in the APR reaction. For embodiments comprising thermocatalytic APR, oxygenated intermediates such as sugar alcohols, sugar polyols, carboxylic acids, and furans can be converted to fuels. The APR reaction can comprise an APR catalyst to aid in the reactions taking place. The APR reaction conditions can be such that an APR reaction can take place along with a hydrogenation reaction, a hydrogenolysis reaction, or both as many of the reaction conditions overlap or are complimentary. The various reactions can result in the formation of one or more oxygenated intermediate streams 124. As used herein, an "oxygenated intermediate" can include one or more polyols, alcohols, ketones, or any other hydrocarbon having at least one oxygen atom.

In some embodiments, the APR catalysts can be a heterogeneous catalyst capable of catalyzing a reaction between hydrogen and carbohydrate, oxygenated intermediate, or both to remove one or more oxygen atoms to produce alcohols and polyols to be fed to the condensation reactor. The APR catalyst can generally include Cu, Re, Ni, Fe, Co, Ru, Pd, Rh, Pt, Os, Ir, and alloys or any combination thereof, either alone or with promoters such as W, Mo, Au, Ag, Cr, Zn, Mn, Sn, B, P, Bi, and alloys or any combination thereof. Other effective APR catalyst materials include either supported nickel or ruthenium modified with rhenium. In some embodiments, the APR catalyst also includes any one of the supports, depending on the desired functionality of the catalyst. The APR catalysts may be prepared by methods known to those of ordinary skill in the art. In some embodiments the APR catalyst includes a supported Group VIII metal catalyst and a metal sponge material (e.g., a sponge nickel catalyst). Raney nickel provides an example of an activated sponge nickel catalyst suitable for use in this invention. In some embodiments, the APR reaction in the invention is performed using a catalyst comprising a nickel-rhenium catalyst or a tungsten-modified nickel catalyst. One example of a suitable catalyst for the APR reaction of the invention is a carbon-supported nickel-rhenium catalyst.

In some embodiments, a suitable Raney nickel catalyst may be prepared by treating an alloy of approximately equal amounts by weight of nickel and aluminum with an aqueous alkali solution, e.g., containing about 25 weight % of sodium hydroxide. The aluminum is selectively dissolved by the aqueous alkali solution resulting in a sponge shaped material comprising mostly nickel with minor amounts of aluminum. The initial alloy includes promoter metals (i.e., molybdenum or chromium) in the amount such that 1 to 2 weight % remains in the formed sponge nickel catalyst. In another embodiment, the APR catalyst is prepared using a solution of ruthenium(III) nitrosylnitrate, ruthenium (III) chloride in water to impregnate a suitable support material. The solution is then dried to form a solid having a water content of less than 1% by weight. The solid is then reduced at atmospheric pressure in a hydrogen stream at 300° C. (uncalcined) or 400° C. (calcined) in a rotary ball furnace for 4 hours. After cooling and rendering the catalyst inert with nitrogen, 5% by volume of oxygen in nitrogen is passed over the catalyst for 2 hours.

In certain embodiments, the APR catalyst may include a catalyst support. The catalyst support stabilizes and supports the catalyst. The type of catalyst support used depends on the chosen catalyst and the reaction conditions. Suitable supports for the invention include, but are not limited to, carbon, silica, silica-alumina, zirconia, titania, ceria, vanadia, nitride, boron nitride, heteropolyacids, hydroxyapatite, zinc oxide, chromia, zeolites, carbon nanotubes, carbon fullerene and any combination thereof.

The conditions for which to carry out the APR reaction will vary based on the type of starting material and the desired products. In general, the APR reaction is conducted at temperatures of 80° C. to 300° C., and preferably at 120° C. to 300° C., and most preferably at 200° C. to 280° C. In some embodiments, the APR reaction is conducted at pressures from 500 KPa to 14000 KPa.

The APR product stream 124 may comprise APR products that include oxygenated intermediates. As used herein, "oxygenated intermediates" generically refers to hydrocarbon compounds having 1 or more carbon atoms and between 1 and 3 oxygen atoms (referred to herein as $C_1+O_{1-3}$ hydrocarbons), such as alcohols, ketones, aldehydes, furans, hydroxy carboxylic acids, carboxylic acids, diols and triols. Preferably, the oxygenated intermediates have from 1 to 6 carbon atoms, or 2 to 6 carbon atoms, or 3 to 6 carbon atoms. Alcohols may include, without limitation, primary, secondary, linear, branched or cyclic $C_1+$ alcohols, such as methanol, ethanol, n-propyl alcohol, isopropyl alcohol, butyl alcohol, isobutyl alcohol, butanol, pentanol, cyclopentanol, hexanol, cyclohexanol, 2-methyl-cyclopentanonol, heptanol, octanol, nonanol, decanol, undecanol, dodecanol, and isomers thereof. The ketones may include, without limitation, hydroxyketones, cyclic ketones, diketones, acetone, propanone, 2-oxopropanal, butanone, butane-2,3-dione, 3-hydroxybutane-2-one, pentanone, cyclopentanone, pentane-2,3-dione, pentane-2,4-dione, hexanone, cyclohexanone, 2-methyl-cyclopentanone, heptanone, octanone, nonanone, decanone, undecanone, dodecanone, methylglyoxal, butanedione, pentanedione, diketohexane, and isomers thereof. The aldehydes may include, without limitation, hydroxyaldehydes, acetaldehyde, propionaldehyde, butyraldehyde, pentanal, hexanal, heptanal, octanal, nonal, decanal, undecanal, dodecanal, and isomers thereof. The carboxylic acids may include, without limitation, formic acid, acetic acid, propionic acid, butanoic acid, pentanoic acid, hexanoic acid, heptanoic acid, isomers and derivatives thereof, including hydroxylated derivatives, such as 2-hydroxybutanoic acid and lactic acid. The diols may include, without limitation, ethylene glycol, propylene glycol, 1,3-propanediol, butanediol, pentanediol, hexanediol, heptanediol, octanediol, nonanediol, decanediol, undecanediol, dodecanediol, and isomers thereof. The triols may include, without limitation, glycerol, 1,1,1 tris(hydroxymethyl)-ethane (trimethylolethane), trimethylolpropane, hexanetriol, and isomers thereof. Furans and furfurals include, without limitation, furan, tetrahydrofuran, dihydrofuran, 2-furan methanol, 2-methyl-tetrahydrofuran, 2,5-dimethyl-tetrahydrofuran, 2-methyl furan, 2-ethyl-tetrahydrofuran, 2-ethyl furan, hydroxylmethylfurfural, 3-hydroxytetrahydrofuran, tetrahydro-3-furanol, 2,5-dimethyl furan, 5-hydroxymethyl-2 (5H)-furanone, dihydro-5-(hydroxymethyl)-2(3H)-furanone, tetrahydro-2-furoic acid, dihydro-5-(hydroxymethyl)-2(3H)-furanone, tetrahydrofurfuryl alcohol, 1-(2-furyl) ethanol, hydroxymethyltetrahydrofurfural, and isomers thereof.

The oxygenated intermediate stream may generally be characterized as comprising components corresponding to the formula: $C_nO_m$, wherein n=1-6 and m=1 to 6, and m≤n. Other elements such as hydrogen may also be present in these molecules. Additional components that may be present in the APR products stream can include hydrogen and other gases such as carbon dioxide. These components can be separated from the oxygenated intermediates or they can be fed to the condensation reaction for removal after the condensation reaction.

In a preferred embodiment, hydrogenation and hydrogenolysis take place in the APR reactor because the same catalysts and conditions are applicable to all three reactions. Hydrogenation and hydrogenolysis reactions are discussed in more detail below. These reactions may be optionally employed in the methods of the invention either separate from APR or in conjunction with APR. One of ordinary skill in the art, with the benefit of this disclosure, would know what conditions to choose to maximize the desired product of the hydrogenation, hydrogenolysis, and APR reactions. The inclusion of all three reactions in a single reaction step may have an advantage of process intensification and cost reduction relative to a process in which the three reactions are carried out in separate vessels. Additional process equipment may be present to move the products streams between reactors in specific embodiments. For example, pumps may be used to pass a fluid product stream between reactor vessels when multiple vessels are used.

In some embodiments of the invention, optionally, it is desirable to convert the carbohydrates and oxygenated intermediates from the hydrolysis reaction and APR reaction to smaller molecules. A suitable method for this conversion is through a hydrogenolysis reaction.

Various processes are known for performing hydrogenolysis. One suitable method includes contacting a carbohydrate or oxygenated intermediate with hydrogen or hydrogen mixed with a suitable gas and a hydrogenolysis catalyst in a hydrogenolysis reaction under conditions sufficient to form a reaction product comprising smaller molecules or polyols. As used herein, the term "smaller molecules or polyols" includes any molecule that has a smaller molecular weight, which can include a smaller number of carbon atoms or oxygen atoms, than the starting carbohydrate. In some embodiments, the reaction products include smaller molecules that include polyols and alcohols. Someone of ordinary skill in the art would be able to choose the appropriate method by which to carry out the hydrogenolysis reaction.

In some embodiments, a 5 and/or 6 carbon carbohydrate molecule can be converted to propylene glycol, ethylene glycol, and glycerol using a hydrogenolysis reaction in the presence of a hydrogenolysis catalyst. The hydrogenolysis catalyst may include the same catalysts discussed above relative to the APR catalyst. In certain embodiments, the catalyst described in the hydrogenolysis reaction can include a catalyst support as described above for the APR catalyst.

The conditions for which to carry out the hydrogenolysis reaction will vary based on the type of starting material and the desired products. One of ordinary skill in the art, with the benefit of this disclosure, will recognize the appropriate conditions to use to carry out the reaction. In general, the hydrogenolysis reaction may be conducted at temperatures of 110° C. to 300° C., and preferably at 170° C. to 220° C., and most preferably at 200° C. to 225° C. In some embodiments, the hydrogenolysis reaction is conducted under basic conditions, preferably at a pH of 8 to 13, and even more preferably at a pH of 10 to 12. In some embodiments, the hydrogenolysis reaction is conducted at pressures in a range between 60 KPa and 16500 KPa, and preferably in a range between 1700 KPa and 14000 KPa, and even more preferably between 4800 KPa and 11000 KPa. In certain embodiments, the conditions described in the hydrogenolysis reaction will be the same as described above for the APR and hydrogenation reaction since the reaction can occur in the same reactor.

The carbohydrates, oxygenated intermediates, or both may take place in a hydrogenation reaction to saturate one or more unsaturated bonds. Various processes are suitable for hydrogenating carbohydrates, oxygenated intermediates, or both. One method includes contacting the feed stream with hydrogen or hydrogen mixed with a suitable gas and a catalyst under conditions sufficient to cause a hydrogenation reaction to form a hydrogenated product. In some embodiments, suitable hydrogenation catalysts may be selected from the list of APR catalysts provided above.

The conditions for which to carry out the hydrogenation reaction will vary based on the type of starting material and the desired products. One of ordinary skill in the art, with the benefit of this disclosure, will recognize the appropriate reaction conditions. In general, the hydrogenation reaction is conducted at temperatures of 80° C. to 250° C., and preferably at 90° C. to 200° C., and most preferably at 100° C. to 150° C. In some embodiments, the hydrogenolysis reaction is conducted at pressures from 500 KPa to 14000 KPa. In some embodiments, the conditions of this reaction match those for the APR reaction The hydrogen used in the hydrogenation reaction of the current invention can include external hydrogen, recycled hydrogen, in situ generated hydrogen, and any combination thereof. As used herein, the term "external hydrogen" refers to hydrogen that does not originate from a bio-based feedstock reaction itself, but rather is added to the system from another source.

In some embodiments, the APR, the hydrogenation and hydrogenolysis catalysts are the same and may exist in the same bed in the same reactor vessel. Each reactor vessel of the invention preferably includes an inlet and an outlet adapted to remove the product stream from the vessel or reactor. In some embodiments, the vessels and reactors include additional outlets to allow for the removal of portions of the reactant stream to help maximize the desired product formation, and allow for collection and recycling of byproducts for use in other portions of the system.

In some embodiments, in the APR reaction, oxygenated intermediates may be produced by catalytically reacting a carbohydrates in the presence of an APR catalyst at a reforming temperature and reforming pressure to produce hydrogen, and catalytically reacting the produced hydrogen with a portion of the carbohydrates over a hydrogenation/hydrogenolysis catalyst and deoxygenation pressure and temperature to produce the desired oxygenated intermediates. In certain embodiments, the hydrogen used can entirely be provided by an external source or supplemented by an external source. In another embodiment, the oxygenate intermediates may also include recycled oxygenated intermediates.

Without intending to be limited by theory, the reactions comprising bio-based feedstock conversion via APR can be expressed as:

Biomass (B) hydrolysis→sugar: $r_S = k_{OH}B$  (Eq. 1)

Sugar degradation→heavy ends: $r_S = -k_d S^2$  (Eq. 2)

Sugar (S) hydrogenation→to sugar alcohol (A): $r_S = -k_H w_H P_{H2} S$  (Eq. 3)

Sugar alcohol (A) APR→desired products: $r_A = -k_R w_R A$  (Eq. 4)

Oxygenated intermediates, which comprise sugar alcohols, are thought to be more stable under APR reaction conditions than carbohydrates such as sugars, such that higher concentrations of oxygenated intermediates can be tolerated in the reaction mixture without an excessive formation of degradation products. Despite somewhat improved stability for oxygenated intermediates, the residence time of liquid phases at APR temperatures relative to APR catalytic contact time can be minimized in order to decrease yield losses to degradation products. One consideration in the process design is to react the carbohydrates to the desired oxygenated intermediates (Eq. 3), and continue on to the desired reaction products (Eq. 4) as soon as they are formed by hydrolysis (Eq. 1) and before the carbohydrate degradation reaction of Eq. 2 can occur. Another consideration includes the reaction conditions of the carbohydrates involved. The $C_5$ carbohydrates from hemicellulose are extracted at temperatures around 160° C., whereas the $C_6$ carbohydrates are extracted following cellulose hydrolysis at temperatures above 160° C., which could result in the rapid degradation of the $C_5$ carbohydrates. Adding reactions involving formation or consumption of carbohydrate S and solving for the steady state concentration gives:

$$S = \frac{k_{OH}B - k_d S^2}{k_H w_H P_{H2}}$$  (Eq. 5)

while degradation products relative to yield of desired intermediates is given by:

$$\frac{-r_d}{r_H} = \frac{k_d S}{k_H w_H P_{H2}}$$  (Eq. 6)

While only theoretical, Eq. 6 tends to indicate that to reduce yield loss to degradation products, the carbohydrate concentration (i.e., S) should be minimized, and hydrogenation activity should be maximized by, for example, increasing the rate constant $k_H$ by adding more active catalyst, or having a higher $H_2$ partial pressure $P_{H2}$, or increasing the concentration of catalyst present ($w_H$) relative to the residence time in free liquid for homogeneous reaction. Eq. 5 teaches that the carbohydrate concentration can be minimized by limiting the hydrolysis rate $k_{OH}$ and maximizing the hydrogenation rate or the APR rate.

The oxygenated intermediate stream 124 may then pass from the APR reaction to an optional separation stage 126, which produces oxygenated intermediate stream 128. In some embodiments, optional separation stage 126 includes elements that allow for the separation of the oxygenated intermediates into different components. In some embodiments of the present invention, the separation stage 126 can receive the oxygenated intermediate stream 124 from the APR reaction and separate the various components into two or more streams. For example, a suitable separator may include, but is not limited to, a phase separator, stripping column, extractor, or distillation column. In some embodiments, a separator is installed prior to the condensation reaction to favor production of higher hydrocarbons by separating the higher polyols from the oxygenated intermediates. In such an embodiment, the higher polyols are recycled back through hydrolysis reactor 114, while the other oxygenated intermediates are passed to the condensation reaction. In addition, an outlet stream from the separation stage 118 containing a portion of the oxygenated intermediates may act as in situ generated solvent when recycled to the hydrolysis reactor 114. In one embodiment, the separation stage 126 can also be used to remove some or all of the lignin from the oxygenated intermediate stream. The lignin may be passed out of the separation stage as a separate stream, for example as output stream 134.

In some embodiments, the oxygenated intermediates are converted to a fuel blend that can be used as a fuel additive through hydrogenation of the oxygenated intermediates. Various processes are suitable for hydrogenating the oxygenated intermediates. One method includes contacting the feed stream with hydrogen or hydrogen mixed with a suitable gas and a catalyst under conditions sufficient to cause a hydrogenation reaction to form a hydrogenated product. Suitable catalysts and reaction conditions are described above.

The hydrogenation of the oxygenated intermediates may produce one or more saturated alcohols, polyols, or hydrocarbons. The alcohols produced in the invention have from 2 to 30 carbon atoms. In some embodiments, the alcohols are cyclic. In another embodiment, the alcohols are branched. In another embodiment, the alcohols are straight chained. Suitable alcohols for the invention include, but are not limited to, butanol, pentanol, hexanol, heptanol, octanol, nonanol, decanol, undecanol, dodecanol, tridecanol, tetradecanol, pentadecanol, hexadecanol, heptyldecanol, octyldecanol, nonyldecanol, eicosanol, uneicosanol, doeicosanol, trieicosanol, tetraeicosanol, and isomers thereof.

The saturated alcohols, polyols, and/or hydrocarbons may be used as a fuel blend additive in transportation or other fuels. In addition, the products may be sold as commodity chemical for further uses known to one of ordinary skill in the art.

In some other embodiments, the oxygenated intermediates discussed above can be converted into higher hydrocarbons through a condensation reaction shown schematically as condensation reaction 130 in FIG. 1. In an embodiment, the higher hydrocarbons may be part of a fuel blend for use as a transportation fuel. In such an embodiment, condensation of the oxygenated intermediates occurs in the presence of a catalyst capable of forming higher hydrocarbons. While not intending to be limited by theory, it is believed that the production of higher hydrocarbons proceeds through a stepwise addition reaction including the formation of carbon-carbon, or carbon-oxygen bond. The resulting reaction products include any number of compounds containing these moieties, as described in more detail below.

Referring to FIG. 1, in some embodiments, an outlet stream 128 containing at least a portion of the oxygenate intermediates can pass to a condensation reaction. The condensation reaction can comprise a variety of catalysts for condensing one or more oxygenated intermediates to higher hydrocarbons. The higher hydrocarbons may comprise a fuel product. The fuel products produced by the condensation reactor represent the product stream from the overall process at higher hydrocarbon stream 110. In an embodiment, the oxygen to carbon ration of the higher hydrocarbons produced through the condensation reaction is less than 0.5, alternatively less than 0.4, or preferably less than 0.3.

In the embodiment shown in FIG. 1, the carbohydrates extracted from the bio-based feedstock using a hydrolysis reaction are passed through an APR reactor to form suitable oxygenated intermediates for the condensation reaction in condensation reactor 130. In an embodiment, the bio-based feedstock may be In certain embodiments, suitable condensation catalysts include an acid catalyst, a base catalyst, or an acid/base catalyst. As used herein, the term "acid/base catalyst" refers to a catalyst that has both an acid and a base functionality or functional sites. In some embodiments the condensation catalyst can include, without limitation, zeolites, carbides, nitrides, zirconia, alumina, silica, aluminosilicates, phosphates, titanium oxides, zinc oxides, vanadium oxides, lanthanum oxides, yttrium oxides, scandium oxides, magnesium oxides, cerium oxides, barium oxides, calcium oxides, hydroxides, heteropolyacids, inorganic acids, acid modified resins, base modified resins, and any combination thereof. In some embodiments, the condensation catalyst can also include a modifier. Suitable modifiers include La, Y, Sc, P, B, Bi, Li, Na, K, Rb, Cs, Mg, Ca, Sr, Ba, and any combination thereof. In some embodiments, the condensation catalyst can also include a metal. Suitable metals include Cu, Ag, Au, Pt, Ni, Fe, Co, Ru, Zn, Cd, Ga, In, Rh, Pd, Ir, Re, Mn, Cr, Mo, W, Sn, Os, alloys, and any combination thereof.

In certain embodiments, the catalyst described in the condensation reaction can include a catalyst support as described above for the hydrogenation reaction. In certain embodiments, the condensation catalyst is self-supporting. As used herein, the term "self-supporting" means that the catalyst does not need another material to serve as support. In another embodiment, the condensation catalyst in used in conjunction with a separate support suitable for suspending the catalyst. In some embodiments, the condensation catalyst support is silica.

The conditions for which to carry out the condensation reaction will vary based on the type of starting material and the desired products. One of ordinary skill in the art, with the benefit of this disclosure, will recognize the appropriate conditions to use to carry out the reaction. In some embodiments, the condensation reaction is carried out at a temperature at which the thermodynamics for the proposed reaction are favorable. The temperature for the condensation reaction will vary depending on the specific starting polyol or alcohol. In some embodiments, the temperature for the condensation reaction is in a range from 80° C. to 500° C., and preferably from 125° C. to 450° C., and most preferably from 125° C. to 250° C. In some embodiments, the condensation reaction is conducted at pressures in a range between 0 Kpa to 9000 KPa, and preferably in a range between 0 KPa and 7000 KPa, and even more preferably between 0 KPa and 5000 KPa.

In some embodiments, the invention comprises a system having a condensation reactor for reacting the APR product stream in the presence of a condensation catalyst to produce at least some higher fuel forming hydrocarbons. Each reactor of the invention preferably includes an inlet and an outlet adapted to remove the product stream from the reactor. In some embodiments, the reactors include additional outlets to allow for the removal of portions of the reactant stream to help maximize the desired product formation, and allow for collection and recycling of byproducts for use in other portions of the system.

The higher hydrocarbons formed by the invention can include a broad range of compounds depending on the reaction conditions and the composition of the oxygenated intermediates fed to the reaction. Exemplary higher hydrocarbons include, but are not limited to, branched or straight chain alkanes that have from 4 to 30 carbon atoms, branched or straight chain alkenes that have from 4 to 30 carbon atoms, cycloalkanes that have from 5 to 30 carbon atoms, cycloalkenes that have from 5 to 30 carbon atoms, aryls, fused aryls, alcohols, and ketones. Suitable alkanes include, but are not limited to, butane, pentane, pentene, 2-methylbutane, hexane, hexene, 2-methylpentane, 3-methylpentane, 2,2,-dimethylbutane, 2,3-dimethylbutane, heptane, heptene, octane, octene, 2,2,4-trimethylpentane, 2,3-dimethyl hexane, 2,3,4-trimethylpentane, 2,3-dimethylpentane, nonane, nonene, decane, decene, undecane, undecene, dodecane, dodecene, tridecane, tridecene, tetradecane, tetradecene, pentadecane, pentadecene, nonyldecane, nonyldecene, eicosane, eicosene, uneicosane, uneicosene, doeicosane, doeicosene, trieicosane, trieicosene, tetraeicosane, tetraeicosene, and isomers thereof.

In some embodiments, the cycloalkanes and the cycloalkenes are unsubstituted. In another embodiment, the cycloalkanes and cycloalkenes are mono-substituted. In yet another embodiment, the cycloalkanes and cycloalkenes are multi-substituted. In the embodiments comprising the substituted cycloalkanes and cycloalkenes, the substituted group includes, without limitation, a branched or straight chain alkyl having 1 to 12 carbon atoms, a branched or straight chain alkylene having 1 to 12 carbon atoms, a phenyl, and any combination thereof. Suitable cycloalkanes and cycloalkenes include, but are not limited to, cyclopentane, cyclopentene, cyclohexane, cyclohexene, methyl-cyclopentane, methyl-cyclopentene, ethyl-cyclopentane, ethyl-cyclopentene, ethyl-cyclohexane, ethyl-cyclohexene, isomers and any combination thereof.

In some embodiments, the aryls formed are unsubstituted. In another embodiment, the aryls formed are mono-substituted. In the embodiments comprising the substituted aryls, the substituted group includes, without limitation, a branched or straight chain alkyl having 1 to 12 carbon atoms, a branched or straight chain alkylene having 1 to 12 carbon atoms, a phenyl, and any combination thereof. Suitable aryls for the invention include, but are not limited to, benzene, toluene, xylene, ethyl benzene, para xylene, meta xylene, and any combination thereof.

The alcohols produced in the invention have from 2 to 30 carbon atoms. In some embodiments, the alcohols are cyclic. In another embodiment, the alcohols are branched. In another embodiment, the alcohols are straight chained. Suitable alcohols for the invention include, but are not limited to, butanol, pentanol, hexanol, heptanol, octanol, nonanol, decanol, undecanol, dodecanol, tridecanol, tetradecanol, pentadecanol, hexadecanol, heptyldecanol, octyldecanol, nonyldecanol, eicosanol, uneicosanol, doeicosanol, trieicosanol, tetraeicosanol, and isomers thereof.

The ketones produced in the invention have from 2 to 30 carbon atoms. In some embodiments, the ketones are cyclic. In another embodiment, the ketones are branched. In another embodiment, the ketones are straight chained. Suitable ketones for the invention include, but are not limited to, butanone, pentanone, hexanone, heptanone, octanone, nonanone, decanone, undecanone, dodecanone, tridecanone, tetradecanone, pentadecanone, hexadecanone, heptyldecanone, octyldecanone, nonyldecanone, eicosanone, uneicosanone, doeicosanone, trieicosanone, tetraeicosanone, and isomers thereof.

In an embodiment, the condensation reaction may produce a fuel blend comprising a gasoline fuel. "Gasoline fuel" refer to a hydrocarbon blend predominantly comprising $C_{5-9}$ hydrocarbons, for example, $C_{6-8}$ hydrocarbons, and having a boiling point range from 32° C. (90° F.) to about 204° C. (400° F.). A gasoline fuel includes, but is not limited to, straight run gasoline, naphtha, fluidized or thermally catalytically cracked gasoline, VB gasoline, and coker gasoline. The hydrocarbon content of a gasoline fuel is determined by ASTM Method D2887.

In this embodiment, the condensation reaction may be carried out at a temperature at which the thermodynamics for the proposed reaction are favorable for the formation of $C_{5-9}$ hydrocarbons. The temperature for the condensation reaction will generally be in a range from 275° C. to 500° C., and preferably from 300° C. to 450° C., and most preferably from 325° C. to 400° C. The condensation reaction can be conducted at pressures in a range between 0 Kpa to 9000 KPa, and preferably in a range between 0 KPa and 7000 KPa, and even more preferably between 0 KPa and 5000 KPa.

The resulting gasoline fuel blend may be subjected to additional processes to treat the fuel blend to remove certain components or further conform the fuel blend to a gasoline fuel standard. Suitable techniques may include hydrotreating to remove any remaining oxygen, sulfur, or nitrogen in the fuel blend. Hydrogenation may be carried after the hydrotreating process to saturate at least some olefinic bonds. Such hydrogenation may be performed to conform the fuel blend to a specific fuel standard (e.g., a gasoline fuel standard). The hydrogenation step of the fuel blend stream can be carried out according to the known procedures, either with a continuous or batch method. In particular, it can be effected by feeding hydrogen at a pressure ranging from 5 bar to 20 bar and at a temperature ranging from 50° C. to 150° C. and reacting for a time varying from 2 to 20 hours in the presence of a hydrogenation catalyst such as a supported palladium or platinum, for example 5% by weight of palladium or platinum on activated carbon.

Isomerization may be used to treat the fuel blend to introduced a desired degree of branching or other shape selectivity to at least some components in the fuel blend. It may be useful to remove any impurities before the hydrocarbons are contacted with the isomerization catalyst. The isomerization step comprises an optional stripping step, wherein the fuel blend from the oligomerization reaction may be purified by stripping with water vapor or a suitable gas such as light hydrocarbon, nitrogen or hydrogen. The optional stripping step is carried out in counter-current manner in a unit upstream of the isomerization catalyst, wherein the gas and liquid are contacted with each other, or before the actual isomerization reactor in a separate stripping unit utilizing counter-current principle.

After the optional stripping step the fuel blend can be passed to a reactive isomerization unit comprising one or several catalyst bed(s). The catalyst beds of the isomerization step may operate either in co-current or counter-current manner. In the isomerization step, the pressure may vary from 20 bar to 150 bar, preferably in the range of 20 bar to 100 bar, the temperature being between 200° C. and 500° C., preferably between 300° C. and 400° C. In the isomerization step, any isomerization catalysts known in the art may be used. Suitable isomerization catalysts can contain molecular sieve and/or a metal from Group VII and/or a carrier. In an embodiment, the isomerization catalyst contains SAPO-11 or SAPO41 or ZSM-22 or ZSM-23 or ferrierite and Pt, Pd or Ni and Al2O3 or SiO2. Typical isomerization catalysts are, for example, Pt/SAPO-11/Al2O3, Pt/ZSM-22/Al2O3, Pt/ZSM-23/Al2O3 and Pt/SAPO-11/SiO2.

Thus, in one embodiment, the fuel blend produced by the processes described herein is a hydrocarbon mixture that meets the requirements for a gasoline fuel (i.e., conforms with ASTM D2887).

In an embodiment, the condensation reaction may produce a fuel blend meeting the requirements for a diesel fuel or jet fuel. Traditional diesel fuels are petroleum distillates rich in paraffinic hydrocarbons. They have boiling ranges as broad as 370° F. to 780° F., which are suitable for combustion in a compression ignition engine, such as a diesel engine vehicle. The American Society of Testing and Materials (ASTM) establishes the grade of diesel according to the boiling range, along with allowable ranges of other fuel properties, such as cetane number, cloud point, flash point, viscosity, aniline point, sulfur content, water content, ash content, copper strip corrosion, and carbon residue. Thus, any fuel blend meeting ASTM D975 can be defined as diesel fuel.

The present invention also provides methods to produce jet fuel. Jet fuel is clear to straw colored. The most common fuel is an unleaded/paraffin oil-based fuel classified as Aeroplane A-1, which is produced to an internationally standardized set of specifications. Jet fuel is a mixture of a large number of different hydrocarbons, possibly as many as a thousand or more. The range of their sizes (molecular weights or carbon numbers) is restricted by the requirements for the product, for example, freezing point or smoke point. Kerosone-type Airplane fuel (including Jet A and Jet A-1) has a carbon number distribution between about C8 and C16. Wide-cut or naphtha-type Aeroplane fuel (including Jet B) typically has a carbon number distribution between about C5 and C15. A fuel blend meeting ASTM D1655 can be defined as jet fuel.

Both Airplanes (Jet A and Jet B) may contain a number of additives. Useful additives include, but are not limited to, antioxidants, antistatic agents, corrosion inhibitors, and fuel system icing inhibitor (FSII) agents. Antioxidants prevent gumming and usually, are based on alkylated phenols, for example, AO-30, AO-31, or AO-37. Antistatic agents dissipate static electricity and prevent sparking. Stadis 450 with dinonylnaphthylsulfonic acid (DINNSA) as the active ingredient, is an example. Corrosion inhibitors, e.g., DCI-4A is used for civilian and military fuels and DCI-6A is used for military fuels. FSII agents, include, e.g., Di-EGME.

A fuel blend meeting the requirements for a diesel fuel (e.g., ASTM D975) or a jet fuel (e.g., ASTM D1655) may be produced using the methods of the present invention. In an embodiment, a method for producing a diesel fuel blend may comprise: providing a bio-based feedstock; contacting the bio-based feedstock with a catalyst and an solvent to form an intermediate stream comprising carbohydrates; contacting the intermediate stream with an APR catalyst to form a plurality of oxygenated intermediates, wherein a first portion of the oxygenated intermediates are recycled to form the solvent; contacting an intermediate oxygenate stream with a condensation catalyst to produce an olefin stream; contacting the olefin stream with an oligomerization catalyst to produce higher hydrocarbons, wherein the higher hydrocarbons may meet the definition of a diesel fuel or a jet fuel.

In this embodiment, the condensation reaction may be carried out at a temperature at which the thermodynamics for the proposed reaction are favorable for the formation of olefins with a carbon number ranging from $C_2$ to $C_8$. The temperature for the condensation reaction will generally be in a range from 80° C. to 275° C., and preferably from 100° C. to 250° C., and most preferably from 150° C. to 200° C. The condensation reaction can be conducted at pressures in a range between 0 Kpa to 9000 KPa, and preferably in a range between 0 KPa and 7000 KPa, and even more preferably between 0 KPa and 5000 KPa. The olefin products produced will generally comprise one or more unsaturated bonds.

The olefin products produced from the condensation reaction may be further processed to form a fuel blend meeting the standard for a diesel fuel or a jet fuel. In an embodiment, the olefin products may be contacted with an oligomerization catalyst to produce a fuel blend. The products of an oligomerization reaction of olefins may include primarily olefins from straight oligomerization or mixtures of olefins, paraffins, cycloalkanes and aromatics. The product spectrum is influenced by both reaction conditions and the nature of the catalyst. The oligomerization of olefins over an acidic catalyst (e.g., a zeolite) is influenced by many factors including thermodynamics, kinetic and diffusional limitations, and shape-selectivity and side reactions.

Without intending to be limited by theory, it is believed that a number of reaction mechanisms are responsible for the ultimate product distribution of the reaction of olefins to form a fuel blend. For example, it is believed that the acid-catalyzed oligomerization of the olefins occurs via a carbocationic mechanism resulting in a sequential chain growth. Molecular weight growth occurs by condensation of any two olefins to a single higher olefin. Olefins also undergo double bond and skeletal isomerization. In addition to oligomerization, any two olefins may react to disproportionate to two olefins of two different carbon numbers, yielding intermediate or "nonoligomer" olefins. This may tend to randomize the molecular weight distribution of the product without significantly changing its average carbon number. Olefin cracking may also occur simultaneously with oligomerization and disproportionation. Olefins may undergo cyclization and hydrogen transfer reactions leading to the formation of cycloolefins, alkyl aromatics and paraffins, in what has been termed conjunct polymerization.

In practice, the kinetics of the oligomerization, disproportionation, and cracking reactions can determine the olefin product distribution under process conditions. At high temperature or low pressure, thermodynamics drive the reaction products to be distributed in the light olefin range whereas low temperature and high pressure tends to favor higher molecular weight olefins. At low temperature, mostly pure oligomers are formed with the majority of the product being trimer and tetramer. With increasing temperature, more disproportionation and cracking and, hence, randomization of the olefin distribution may occur. At moderate temperatures, the product may essentially be random and average carbon number can be maximized. In addition to the other thermodynamic considerations, the reactivity of olefins decreases with increasing carbon number due to the diffusional limitations within the pore system of the catalyst and the lower probability of coincident reaction centers of the molecules colliding for a bimolecular reaction.

In some embodiments, the olefinic feed stream may be pretreated to remove any oxygenates or oxygen atoms that may be present in the intermediate olefin stream. The removal of oxygenates from the olefinic stream may take place by various methods known in the art, for example, hydrotreating to remove any excess oxygen, sulfur, or nitrogen.

The oligomerization catalyst with which the olefinic feed stream is contacted may be an acid catalyst including, but not limited to, a zeolite including a shape selective or pentasil ZSM-5 zeolite types. A specific zeolite may have a shape selectivity that can be used to form a higher hydrocarbon that does not contain excessively branched hydrocarbons. For example, the acid catalyst may comprise a pentacil zeolite with a $SiO_2/Al2O3$ ratio ranging from about 30 to about 1000 in hydrogen or sodium form. Other zeolites with medium pores (e.g., ZSM-12, -23) may also produce oligomers with a low branching degree due to the "shape selectivity" phenomenon. Other acid catalysts may include, but are not limited to, amorphous acid materials (silicoaluminas), large pore zeolites, resins with cationic exchange, and supported acids (e.g., phosphoric acid).

In an embodiment, an olefinic oligomerization reaction may be carried out in any suitable reactor configuration. Suitable configurations include, but are not limited to, batch reactors, semi-batch reactors, or continuous reactor designs such as fluidized bed reactors with external regeneration vessels. Reactor designs may include, but are not limited to tubular reactors, fixed bed reactors, or any other reactor type suitable for carrying out the oligomerization reaction. In an embodiment, a continuous oligomerization process for the production of diesel and jet fuel boiling range hydrocarbons may be carried out using an oligomerization reactor for contacting an olefinic feed stream comprising short chain olefins having a chain length of from 2 to 8 carbon atoms with a zeolite catalyst under elevated temperature and pressure so as to convert the short chain olefins to fuel blend in the diesel boiling range. The oligomerization reactor may be operated at relatively high pressures of about 20 to 100 bar, and at a temperature of between 150° C. and 300° C., preferably 200° C. to 250° C., with a zeolitic oligomerization catalyst.

The reactor design may also comprise a catalyst regenerator for receiving deactivated or spent catalyst from the oligomerization reactor. The catalyst regenerator for the regeneration of the catalyst may operate at relatively low pressures of 1 to 5 bar, typically 1 to 2 bar and at temperatures of about 500° C. to 1000° C., typically 500° C. to 550° C., to burn off the coke or hydrocarbons fouling the catalyst. Air or oxygen may be introduced to the catalyst regenerator to allow any coke, carbon, or other deposits on the deactivated catalyst to be oxidized, thus regenerating the catalyst for further use in the reaction process.

In an embodiment, the regeneration reactor receives the deactivated catalyst from the oligomerization reactor. The deactivated catalyst may be removed using known means for removing a catalyst from a reactor vessel. In an embodiment, the deactivated catalyst may be removed from the oligomerization reactor using a pressure reduction system for taking the catalyst from the relatively high operating pressure of the oligomerization reactor down to the relatively low operating pressure of the catalyst regenerator. The pressure reduction system may include a lock hopper and a disengagement hopper, as known to one of ordinary skill in the art for isolating the high pressure of the reactor from the low pressure of the catalyst regenerator.

Once the catalyst has been regenerated, the regenerated catalyst may be transferred to the oligomerization reactor using known means for transporting a catalyst to a reactor vessel. In an embodiment, the regenerated catalyst may be transported to the inlet of the oligomerization reactor using a pressurizing system to increase the pressure of the regenerated catalyst prior introducing the regenerated catalyst into the oligomerization reactor. The pressurizing system may include a regenerated catalyst flow control system which is configured for safe operation thereof, a lock hopper, and pressure increasing means, for example, a venturi compressor, a mechanical compressor, or the like, to introduce the pressurized regenerated catalyst stream into the oligomerization reactor.

The resulting oligomerization stream results in a fuel blend that may have a wide variety of products including products comprising $C_5$ to $C_{24}$ hydrocarbons. Additional processing may be used to obtain a fuel blend meeting a desired standard. An initial separation step may be used to generate a fuel blend with a narrower range of carbon numbers. In an embodiment, a separation process such as a distillation process is used to generate a fuel blend comprising $C_{12}$ to $C_{24}$ hydrocarbons for further processing. The remaining hydrocarbons may be used to produce a fuel blend for gasoline, recycled to the oligomerization reactor, or used in additional processes. For example, a kerosene fraction may be derived along with the diesel fraction and can either be used as an illuminating paraffin, as a jet fuel blending component in conventional crude or synthetic derived jet fuels, or as reactant (especially $C_{10}$-$C_{13}$ fraction) in the process to produce LAB (Linear Alkyl Benzene). The naphtha fraction after hydroprocessing can be routed to a thermal cracker for the production of ethylene and propylene or routed to as is to a catalytic cracker to produce ethylene, propylene, and gasoline.

Additional processes may be used to treat the fuel blend to remove certain components or further conform the fuel blend to a diesel or jet fuel standard. Suitable techniques may include hydrotreating to remove any remaining oxygen, sulfur, or nitrogen in the fuel blend. Hydrogenation may be carried after the hydrotreating process to saturate at least some olefinic bonds. Such hydrogenation may be performed to conform the fuel blend to a specific fuel standard (e.g., a diesel fuel standard or a jet fuel standard). The hydrogenation step of the fuel blend stream can be carried out according to the known procedures, either with the continuous or batch method. In particular, it can be effected by feeding hydrogen at a pressure ranging from 5 bar to 20 bar and at a temperature ranging from 50° C. to 150° C. and reacting for a time varying from 2 to 20 hours in the presence of a hydrogenation catalyst such as a supported palladium or platinum, for example 5% by weight of palladium or platinum on activated carbon.

Isomerization may be used to treat the fuel blend to introduced a desired degree of branching or other shape selectivity to at least some components in the fuel blend. It may be useful to remove any impurities before the hydrocarbons are contacted with the isomerization catalyst. The isomerization step comprises an optional stripping step, wherein the fuel blend from the oligomerization reaction may be purified by stripping with water vapor or a suitable gas such as light hydrocarbon, nitrogen or hydrogen. The optional stripping step is carried out in counter-current manner in a unit upstream of the isomerization catalyst, wherein the gas and liquid are contacted with each other, or before the actual isomerization reactor in a separate stripping unit utilizing counter-current principle.

After the optional stripping step the fuel blend can be passed to a reactive isomerization unit comprising one or several catalyst bed(s). The catalyst beds of the isomerization step may operate either in co-current or counter-current manner. In the isomerization step, the pressure may vary from 20 bar to 150 bar, preferably in the range of 20 bar to 100 bar, the temperature being between 200° C. and 500° C., preferably between 300° C. and 400° C. In the isomerization step, any isomerization catalysts known in the art may be used. Suitable isomerization catalysts can contain molecular sieve and/or a metal from Group VII and/or a carrier. In an embodiment, the isomerization catalyst contains SAPO-11 or SAPO41 or ZSM-22 or ZSM-23 or ferrierite and Pt, Pd or Ni and Al2O3 or SiO2. Typical isomerization catalysts are, for example, Pt/SAPO-11/$Al_2O_3$, Pt/ZSM-22/$Al_2O_3$, Pt/ZSM-23/$Al_2O_3$ and Pt/SAPO-11/$SiO_2$.

Thus, in one embodiment, the fuel blend produced by the processes described herein is a hydrocarbon mixture that meets the requirements for jet fuel (i.e., conforms with ASTM D1655). In another embodiment, the product of the processes described herein is a hydrocarbon mixture that comprises a fuel blend meeting the requirements for a diesel fuel (i.e., conforms with ASTM D975).

The methods and systems for producing higher hydrocarbons and/or a fuel blend from bio-based feedstocks can have an increased relative fuel yield as compared to other bio-based feedstock conversion processes. As used herein, the term "relative fuel yield" takes into account the percentage of carbon atoms that are extracted as carbohydrates, exclusive of lignins, from a bio-based feedstock that are present in the higher hydrocarbons produced as a product on a mole basis. The relative fuel yield is relative to yield obtained from feeding an amount of sorbitol equivalent to the total amount of carbohydrates extracted from the bio-based feedstock on a carbon basis into the processing reaction. The relative fuel yield can be calculated by dividing the total amount of carbon present in the higher hydrocarbons formed from the process by the total amount of carbon present in the higher hydrocarbons obtained from feeding sorbitol into the processing reaction. The total mass of carbon in the higher hydrocarbons can be directly measured at the outlet of the fuel processing reaction (e.g., the hydrogenation reaction, the condensation reaction, the oligomerization reaction) or at any point at which the higher hydrocarbons are ready to exit the process.

In an embodiment of the present invention, the relative fuel yield of the current process may be greater than other bio-based feedstock conversion processes. Without wishing to be limited by theory, it is believed that the use of a multi-temperature hydrolysis reaction process along with the direct APR of the extracted compounds allows for a greater percentage of the bio-based feedstock to be converted into higher hydrocarbons while limiting the formation of degradation products. In an embodiment, the relative fuel yield of the process can be greater than or equal to 60%, or alternatively, greater than or equal to 70%.

To facilitate a better understanding of the present invention, the following examples of certain aspects of some embodiments are given. In no way should the following examples be read to limit, or define, the entire scope of the invention.

EXAMPLES

Aqueous Phase Reforming Experiments

Direct aqueous phase reforming (APR) experiments were conducted in 100-ml stirred reactors with draft-tube gas-induction impeller (Parr Series 4590). Reaction tests for direct bio-based feedstock reforming entailed filling the reactor with 60-grams of solvent (deionized water, or a mixture of DI water and isopropanol (IPA), and 3-3.5 grams of bio-based feedstock comprising biomass (bagasse, or pine sawdust)). One (1) gram of acetic acid was optionally charged to facilitate biomass hydrolysis.

Bagasse was milled via a 1-mm grate. Dry, debarked Loblolly pine was ground via blender (Thomas Scientific) and sieved to less than 30 mesh. Dry solids fraction was determined by vacuum drying at 80° C.-82° C. One gram of aqueous phase reforming catalyst (reduced 5% Pt/C catalyst at 50% moisture, or powdered 1.9% Pt/$Al_2O_3$) was charged to the reactor, which was charged with 600 psi of hydrogen or nitrogen. To minimize degradation of hydrolysate to heavy ends, each reactor was typically heated with a staged temperature sequence of one hour at 160° C., 190° C., 225° C., and finally 250° C., before leaving overnight at the final setpoint.

Comparison tests were also conducted with glucose or sorbitol fed directly to the reaction in place of biomass, to simulate and quantify conversion of model hydrolysate to APR intermediates. Glucose is one of the sugars readily leached from biomass in hot water, while sorbitol is readily formed via hydrogenation of glucose, where platinum or other catalysts capable of hydrogenation are present.

A batch reaction time of 20 hours under these conditions corresponds to a weight hourly space velocity (g-feed/g-catalyst/h) of about 3, for a comparable continuous flow reactor. A 0.5-micron sintered metal filter attached to a dip tube allowed liquid samples to be taken throughout the course of reaction, without loss of biomass or catalyst.

Samples were analyzed by an HPLC method based on combined size and ion exclusion chromatography, to determine unreacted sorbitol, and amount of $C_3$ and smaller polyols formed: glycerol (Gly), ethylene glycol (EG), and 1,2-propylene glycol (PG). Additional GC analysis via a moderate polarity DB-5 column were conducted to assess formation of $C_6$ and lighter oxygenates (ketones, aldehydes, alcohols). A separate GC equipped with thermal conductivity and flame ionization (FID) detectors for refinery gas analysis, were used for detection of $H_2$, $CO_2$, and light alkanes $C_1$-$C_5$. GC-mass spec was used to characterize select APR reaction product mixtures. Table 1 lists compounds identified in the aqueous phase following aqueous phase reforming of sorbitol.

While oxygenates formed during APR can be blended to fuel, condensation over a strong acid catalyst yields a direct blend suitable for gasoline. ZSM-5 zeolite provides an aromatic-rich blend. Effectiveness of the initial APR step can be assessed via passing the APR reaction product over ZSM-5, to characterize the yield of gasoline-range components. These tests were conducted via a pulse microreactor formed via packing a GC injector 0.05 grams of ZSM-5 acid condensation catalyst, and held at 375° C. One-microliter of APR reactor product was injected into the catalyst bed, to examine formation of liquid fuel products. The catalytic injector insert was followed by Restek Rtx-1701 and DB-5 capillary GC columns in series, to resolve hydrocarbon and aromatic reaction components via temperature-programmed analysis.

A mass-sensitive flame ionization detector (FID) was used for analysis to characterize the yields, such that GC areas for alkane and aromatic hydrocarbon products from the condensation step, can be related to the amount of carbon charged as "feed" for the aqueous phase reforming step. A comparison run (Example 3) was conducted with 25 wt % sorbitol as the feed to APR, where sorbitol represents the fully hydrolyzed and hydrogenated $C_6$ sugar which can be extracted from biomass. Total mass of liquid alkane and aromatic products formed via acid condensation following APR reaction with sorbitol as feed, as indicated by the total area of the FID response, relative to the wt % C charged as sorbitol feed, was assigned a yield value of fuel/bio-carbon of 1.0. Fuel yields per wt % C charged as feed, were similarly computed from the FID response of the condensation pulse microreactor, for runs using biomass as feed.

Examples 1-3

Direct Aqueous Phase Reforming of Bagasse

Batch APR reactions with bagasse as feed, and with a comparison of 25% sorbitol as feed, were performed as described above. 1.7% acetic acid was added to simulate catalysis of hydrolysis by recycle acid. Products formed from this concentration of acetic acid were subtracted from total product formation, to calculate the net production of liquid fuels from bagasse.

For Example 1, the yield of liquid fuels products (per unit wt % C) was observed to increase, as temperature was increased stage wise via the sequence 160, 190, and 225° C. A further increase in temperature with heating overnight let to a slight decrease in yield per carbon fed. Overall yields from bagasse were calculate as 82% of the yield/C obtained with model compound sorbitol as feed (Example 3). This compares favourably with the 77% hydrolysable fraction of dry bagasse, which contains 20% lignin and 3% ash. Results thus indicate that all sugar precursors present in bagasse were hydrolyzed, and selectively converted to liquid biofuel.

Example 2 examined yields for a similar experiment where hot water plus acetic acid hydrolysis was conducted first, without the concerted presence of Pt/C APR catalyst. While a small yield/C was obtained following thermal contacting at 225° C. in Example 2A, the yield obtained from acid condensation diminished upon further heating to 250° C., in the absence of catalyst (Example 2B). Pt/C catalyst was then added to the resulting liquid for Example 2C, to effect aqueous phase reforming of hydrolysate from the initial heating step. Yields/C were less than those obtained from the 1.7% acetic acid added as hydrolysis catalyst, when the resulting liquid was pulsed over ZSM-5 condensation catalyst.

This result shows the critical importance of concerted APR reaction with hydrolysis of biomass. In the absence of concerted aqueous phase reforming, the hydrolysate undergoes irreversible degradation (presumably to heavy ends), and cannot be reverted to liquid fuels upon subsequent APR and condensation.

TABLE 1

Direct APR of Biomass

| Ex # | Feed | % CHO actives | Catalyst | Tmax ° C. | Total hours | Liquid fuel Yield/C |
|---|---|---|---|---|---|---|
| 1A | Bagass | 5.50% | 5% Pt/C | 160 | 1.0 | 0.068 |
| 1B | Bagass | 5.50% | 5% Pt/C | 190 | 2.0 | 0.601 |
| 1C | Bagass | 5.50% | 5% Pt/C | 225 | 3.0 | 0.821 |
| 1D | Bagass | 5.50% | 5% Pt/C | 250 | 21.0 | 0.739 |
| 2A | Bagass | 5.50% | none | 225 | 2.5 | 0.210 |
| 2B | Bagass | 5.50% | none | 250 | 21.0 | 0.070 |
| 2C | Cycle 2B | 5.50% | 5% Pt/C | 250 | 3.0 | −0.041 |
| 3A | Sorbitol | 25% | 5% Pt/C | 250 | 22.3 | 1.000 |

Table 2 shows the selectivity to alkanes and aromatics following condensation over ZSM-5, for the examples of Table 1. The mixture is considered suitable for blending as gasoline.

TABLE 2

Condensation Product Compositions

| Ex# | Alkanes wt % | Benzene wt % | Toluene wt % | Et Benz wt % | Xylenes wt % | 3 Mebenz wt % | Napth's wt % | Total wt % |
|---|---|---|---|---|---|---|---|---|
| 1A | 67.7 | 8.30 | 8.15 | −2.04 | −0.42 | −6.84 | 25.62 | 100.5 |
| 1B | 44.3 | 7.89 | 19.07 | 5.66 | 8.30 | 1.29 | 11.02 | 97.6 |
| 1C | 45.7 | 7.55 | 19.25 | 9.96 | 4.58 | 1.52 | 9.72 | 98.3 |
| 1D | 63.2 | 6.01 | 10.56 | 4.95 | 2.93 | 1.72 | 7.60 | 97.0 |
| 2A | 61.6 | 7.86 | 11.00 | 12.06 | 5.21 | −1.26 | 21.96 | 118.4 |
| 2B | 41.7 | 7.98 | 12.61 | 3.68 | 0.90 | −2.53 | 45.34 | 109.7 |
| 2C | na | na | na | na | na | na | na | 0.0 |
| 3A | 28.0 | 10.3 | 17.8 | 1.2 | 15.3 | 7.2 | 14.8 | 94.5 |

3 Me-benz = trimethylbenzenes;
Et Benz = ethyl benzenes;
napth's = napth's = naphthalenes Characterization of the intermediates formed from the APR step of Example 3A is given in Table 3. APR of sugar or sugar alcohol results in a plethora of mono-, di, and tri-oxygenate compounds, including carboxylic acids which cause a drop in pH to ca. 3.5-4.0. These acids can catalyze hydrolysis of biomass, upon recycle of the reaction mixture.

TABLE 3

Components identified in Aqueous Phase Reforming (APR) of sorbitol [GC-MS].

Propionaldehyde
Acetone
2,5-Dimethyltetrahydrofuran
Tetrahydrofuran + Vinyl formate
2-Methyltetrahydrofuran
Methanol
Isopropyl acetate + 2-Butanone
Tetrahydropyran
Isopropyl Alcohol
Ethanol
2-Pentanone & 3-Pentanone
2-Butanol
n-Propanol
3-Hexanone
2-Hexanone
2-Methylcyclopentanone
3-Hexanol
3-Methylcyclopentanone
2-Hexanol
1-Pentanol
Dihydro-2-methyl-3(2H)-Furanone
3-Hydroxy-2-butanone
2-Methyl-1-pentanol
Ethyl lactate
1-Hexanol
1-Hydroxy-2-butanone
Acetic acid
2,5-Hexanedione
Propionic acid
2,3-Butanediol + Isobutyric Acid
Propylene glycol
Ethylene glycol
Butyric acid
Valeric acid
Hexanoic acid
Glycerol
Isosorbide
2,5-Dimethyltetrahydrofuran
2,3-Butanediol + Isobutyric Acid Examples 4-12

Table 4 shows direct biomass APR and hydrogenation experiments with bagasse as feedstock. Acetic acid and isopropanol (IPA) were added to simulate intermediates from bioforming which are known to assist in biomass hydrolysis and solubilization. At the end of these experiments, the reaction mixture was filtered on Whatman #2 filter paper to recover catalyst and undigested bagasse, from which a percent "digested" could be calculated. As used herein, "digested" means soluble enough to pass through a Whatman #2 filter paper after cooling to room temperature.

The minimum "digested" bagasse was 70.9%, and in many cases the digested bagasse approached 100%. Filtered samples were not analyzed for ash content for current experiments. The extent to which acetic acid addition may have solubilized salts as acetate is unknown. Certainly, digestion greater than 70% indicates solubilization of lignin, which was expected where IPA was added as initial solvent. Light alcohols capable of solubilizing lignins were also be generated during APR of sugars or sugar alcohols.

TABLE 4

Direct Biomass APR or hydrogenation

| Ex # | Bagass wt % | Acetic acid wt % | IPA wt % | Catalyst | Wt % catalyst | Gas phase | Tmax ° C. | Time hours | Percent digest |
|---|---|---|---|---|---|---|---|---|---|
| 4 | 4.8% | 0.0% | 0.0% | 5% Pt/C | 0.72% | H2 | 160 | 125.0 | 70.9% |
| 5 | 4.8% | 2.0% | 50.0% | 5% Pt/C | 0.72% | H2 | 250 | 23.0 | 97.2% |
| 6 | 4.8% | 2.0% | 50.0% | 5% Pt/C | 0.71% | H2 | 250 | 12.0 | 104.6% |
| 7 | 4.8% | 2.0% | 50.0% | 5% Ru/C | 0.71% | H2 | 250 | 8.7 | 102.5% |
| 8 | 4.8% | 2.0% | 0.0% | 5% Ru/C | 0.77% | H2 | 250 | 20.0 | 102.6% |
| 9 | 4.8% | 2.0% | 50.0% | None | 0.00% | H2 | 250 | 5.0 | 88.5% |
| 10 | 5.5% | 1.0% | 0.0% | 5% Pt/C | 0.83% | H2 | 250 | 23.0 | 98.9% |
| 11 | 5.5% | 1.2% | 0.0% | None | 0.00% | N2 | 250 | 20.0 | N/A |
| 11B | 5.5% | 1.2% | 0.0% | +Pt/C & H2 | 0.82% | H2 | 260 | 4.0 | 84.5% |
| 12 | 4.7% | 1.1% | 50.0% | None | 0.00% | N2 | 250 | 8.0 | 95.3% |

Both ruthenium hydrogenation catalyst and platinum APR catalysts were used. For ruthenium, the expected pathway is one of hydrogenation of hydrolyzed biomass to form sugar alcohols at temperatures below 200° C., and further hydrogenolysis to form polyols such as ethylene glycol (EG or MEG for "mono"), propylene glycol (PG or MPG), glycerol, or even isosorbide via dehydration. For APR, the reaction products were reformed by platinum to give smaller molecular weight species amenable to condensation to liquid hydrocarbon fuels. Where IPA was added at 50%, solutions remained crystal clear with a yellow color for weeks of storage. Where IPA was not added, solutions would flock and precipitate over a period of time (days). The black precipitate formed at the bottom of sample vials since it was denser than water. All solutions that were sampled via dip tube with 5-micron filter. Addition of IPA, acetic acid, and catalyst generally increased the extent of digestion per unit time. Very high digestion was accomplished via use of catalyst together with acetic acid, or with IPA/acetic combination without catalyst.

Therefore, the invention is well adapted to attain the ends and advantages mentioned as well as those that are inherent therein. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

Example 13

The 100-ml batch reactor was charged with 28.28 grams of isopropanol (IPA), 28.41 grams of deionized water, 1.018 grams of acetic acid, 0.995 grams of 5% Pt/C APR catalyst, and 3.478 grams of 1 micron milled bagasse at 4.7% moisture. The reactor was heated with mixing to 175° C., 200° C., 225° C., and finally 250° C. for 1.5-hour increments, before leaving overnight (23 hours total). Liquid and gas phase samples were taken, before cooling to add an additional amount of pine sawdust (3.51, 3.20, 2.99, and 2.95 grams) for 4 additional cycles. Cumulative addition after five cycles corresponded to 21.1 wt % dry solids addition to the final reactor mixture. By staging addition of biomass solids, a moderate viscosity slurry with free liquid was maintained.

Recovery of undigested solids by filtration indicated 94% of the bagasse dry solids had been converted to liquid products and/or solubilised in the reaction mixture. A GC analysis of the both oil and aqueous phases indicated an estimated 11% wt % liquid product formation relative to a maximum expected value of 9.1% basis carbon content of feed charged. Observed liquid products were more volatile than sorbitol, basis GC retention times. The experiment demonstrates an ability to solubilise and reform biomass via direct APR, to obtain concentrations of intermediates in excess of 5 wt %, as required for economic processing in subsequent condensation reactions.

Example 14

The 100-ml batch reactor was charged with 30.182-g of isopropanol (IPA) and 30.069 grams of deionized water.

1.0515 grams of acetic acid were added as simulated recycle hydrolysis catalyst. 1.0505 grams of 5% Pt/C APR catalyst (50% wet) were also charged. 3.53 grams of Loblolly pine (<30 mesh, 18% moisture) were charged for an initial cycle, along with 87 kPa of $H_2$. The reactor was heated with mixing to 175° C., 200° C., 225° C., and finally 250° C. for 1.5-hour increments, before leaving overnight (23 hours total). Liquid and gas phase samples were taken, before cooling to add an additional amount of pine sawdust (3.47, 3.48, 3.50, and 3.51 grams) for 4 additional cycles. Cumulative addition after five cycles corresponded to 22.9 wt % dry solids addition to the final reactor mixture. By staging addition of biomass solids, a moderate viscosity slurry with free liquid was maintained.

Recovery of undigested solids by filtration indicated 78% of the pine dry solids had been converted to liquid products. A GC analysis of the liquid phase verified 5.9 wt % of liquid products formed with retention times less than sorbitol, relative to a maximum 7.6 wt % possible from carbon present in feed, at this conversion. These results show an ability to hydrolyze and reform softwood (pine) to liquid fuels (oxygenates), to obtain a concentration of greater than 5 weight percent, as desired for separation and use as a fuel additive, or for economic further processing via condensation to liquid fuels.

What is claimed is:

1. A method comprising:
    contacting a solid biomass feedstock comprising lignin with (i) an aqueous medium comprising an organic acid, (ii) hydrogen, and (iii) an aqueous phase reforming (APR) catalyst in a reaction vessel;
    wherein at least a portion of the solid biomass feedstock is converted to a carbohydrate in a hydrolysis reaction and the carbohydrate is converted to a first reaction product in an APR reaction;
    wherein the hydrolysis reaction and the APR reaction are conducted in a single step;
    wherein the first reaction product comprises a plurality of oxygenated intermediates;
    wherein at least some of said oxygenated intermediates are provided as an oxygenated intermediate stream comprising a first portion and a second portion;
    recycling the first portion of the oxygenated intermediate stream to form at least a portion of the aqueous medium; and
    processing at least the second portion of the oxygenated intermediate stream to form a fuel blend.

2. The method of claim 1 wherein the solid biomass feedstock comprises wood materials.

3. The method of claim 1 wherein the solid biomass feedstock comprises agricultural wastes.

4. The method of claim 1 wherein the solid biomass feedstock comprises energy crops.

5. The method of claim 1 wherein the contacting is carried out at a temperature in the range of 80° C. to 300° C.

6. The method of claim 5 wherein the contacting is carried out at a pressure in the range of 60 KPa to 16500 KPa.

7. The method of claim 5 wherein the processing of at least the second portion of the oxygenated intermediate stream comprises contacting at least the second portion of the oxygenated intermediate stream with a hydrogenation catalyst to form the fuel blend.

8. The method of claim 5 wherein the processing of at least the second portion of the oxygenated intermediate stream comprises contacting at least the second portion of the oxygenated intermediate stream with a condensation catalyst to form the fuel blend.

9. The method of claim 5 wherein the processing of at least the second portion of the oxygenated intermediate stream comprises contacting at least the second portion of the oxygenated intermediate stream with an acid catalyst to form at least some olefins; and contacting the olefins with an oligomerization catalyst to form the fuel blend.

10. The method of claim 1 wherein the lignin is removed from the oxygenated intermediate stream.

11. The method of claim 1 wherein the organic acid comprises a carboxylic acid.

12. The method of claim 11 wherein the carboxylic acid is selected from a group consisting of acetic, formic, levulinic acid, and any combination thereof.

13. The method of claim 1 wherein the organic acid in the reaction vessel is in an amount of at least 1.0 wt % based on the weight of the aqueous medium.

* * * * *